US009608475B1

(12) United States Patent
  Karanikos et al.

(10) Patent No.: US 9,608,475 B1
(45) Date of Patent: Mar. 28, 2017

(54) WIRELESS CHARGER FOR AN ELECTRONIC DEVICE

(71) Applicant: APPLE INC., Cupertino, CA (US)

(72) Inventors: Demetrios B. Karanikos, San Francisco, CA (US); Paul J. Thompson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/946,602

(22) Filed: Nov. 19, 2015

Related U.S. Application Data

(60) Provisional application No. 62/215,659, filed on Sep. 8, 2015.

(51) Int. Cl.
  *H02J 7/00* (2006.01)
  *H02J 7/02* (2016.01)
  *H04B 1/3827* (2015.01)

(52) U.S. Cl.
  CPC ............ *H02J 7/025* (2013.01); *H04B 1/3827* (2013.01)

(58) Field of Classification Search
  CPC .............................. H02J 7/025; H02J 7/0044
  USPC .......................... 307/104; 320/108, 113–115
  See application file for complete search history.

(56) References Cited

U.S. PATENT DOCUMENTS

| | | | |
|---|---|---|---|
| 4,471,493 A | 9/1984 | Schober et al. | |
| 4,897,873 A | 1/1990 | Beutler et al. | |
| 5,001,659 A | 3/1991 | Watabe et al. | |
| 5,923,751 A | 7/1999 | Ohtsuka et al. | |
| 6,011,699 A | 1/2000 | Murray et al. | |
| 6,344,977 B1 | 2/2002 | Takagi et al. | |
| 2009/0121677 A1* | 5/2009 | Inoue ..................... | H02J 7/025 320/108 |

(Continued)

FOREIGN PATENT DOCUMENTS

| | | | | |
|---|---|---|---|---|
| KR | 101285084 B1 * | 7/2013 | ............... | H02J 7/00 |
| TW | M467240 U | 12/2013 | | |

(Continued)

OTHER PUBLICATIONS

U.S. Appl. No. 14/946,619, "Non-Final Office Action", Jun. 30, 2016, 11 pages.

(Continued)

*Primary Examiner* — Drew A Dunn
*Assistant Examiner* — Zixuan Zhou
(74) *Attorney, Agent, or Firm* — Kilpatrick Townsend & Stockton LLP

(57) ABSTRACT

A wireless charger includes a base having a base opening and an interior cavity defined by upper and lower shells and an inner sidewall extending between the upper and lower shells to define the base opening. An aperture is formed through the inner sidewall between the interior cavity and the base opening and a hinge is connected to the base within the interior cavity and extends through the aperture. The charger further includes a wireless charging assembly pivotably attached to the base by the hinge and moveable between a down position in which the wireless charging assembly is disposed within the base opening and an up position in which the wireless charging assembly extends outside the base. The charging assembly is configured to wirelessly transmit power across the charging surface to a power receiving unit of a portable electronic device.

20 Claims, 18 Drawing Sheets

(56) References Cited

U.S. PATENT DOCUMENTS

| | | |
|---|---|---|
| 2009/0212637 A1* | 8/2009 | Baarman .............. H01F 7/0247 |
| | | 307/104 |
| 2011/0164375 A1 | 7/2011 | Hayashida et al. |
| 2012/0091948 A1 | 4/2012 | Shinde et al. |
| 2012/0112553 A1 | 5/2012 | Stoner, Jr. et al. |
| 2012/0169276 A1 | 7/2012 | Wang et al. |
| 2013/0141037 A1 | 6/2013 | Jenwatanavet et al. |
| 2013/0169057 A1 | 7/2013 | Jung et al. |
| 2014/0308995 A1 | 10/2014 | Wu et al. |
| 2015/0091522 A1 | 4/2015 | Byrne et al. |
| 2015/0098184 A1 | 4/2015 | Tsai et al. |
| 2015/0102879 A1 | 4/2015 | Jacobs |
| 2015/0270058 A1 | 9/2015 | Golko et al. |

FOREIGN PATENT DOCUMENTS

| | | |
|---|---|---|
| WO | 9852350 A1 | 11/1998 |
| WO | 2013055671 A1 | 4/2013 |
| WO | 2015-148703 A1 | 1/2015 |

OTHER PUBLICATIONS

Notice of Allowance with notification date of Nov. 23, 2016 in U.S. Appl. No. 14/946,619.
European Patent Application No. 16186473.1, "Extended Search Report", mailed Jan. 3, 2017, 6 pages.
U.S. Appl. No. 14/946,619, "Corrected Notice of Allowability", mailed Jan. 3, 2017, 12 pages.
Australia Patent Application No. 2016222395, "Examination Report", mailed Feb. 3, 2017, 6 pages.

\* cited by examiner

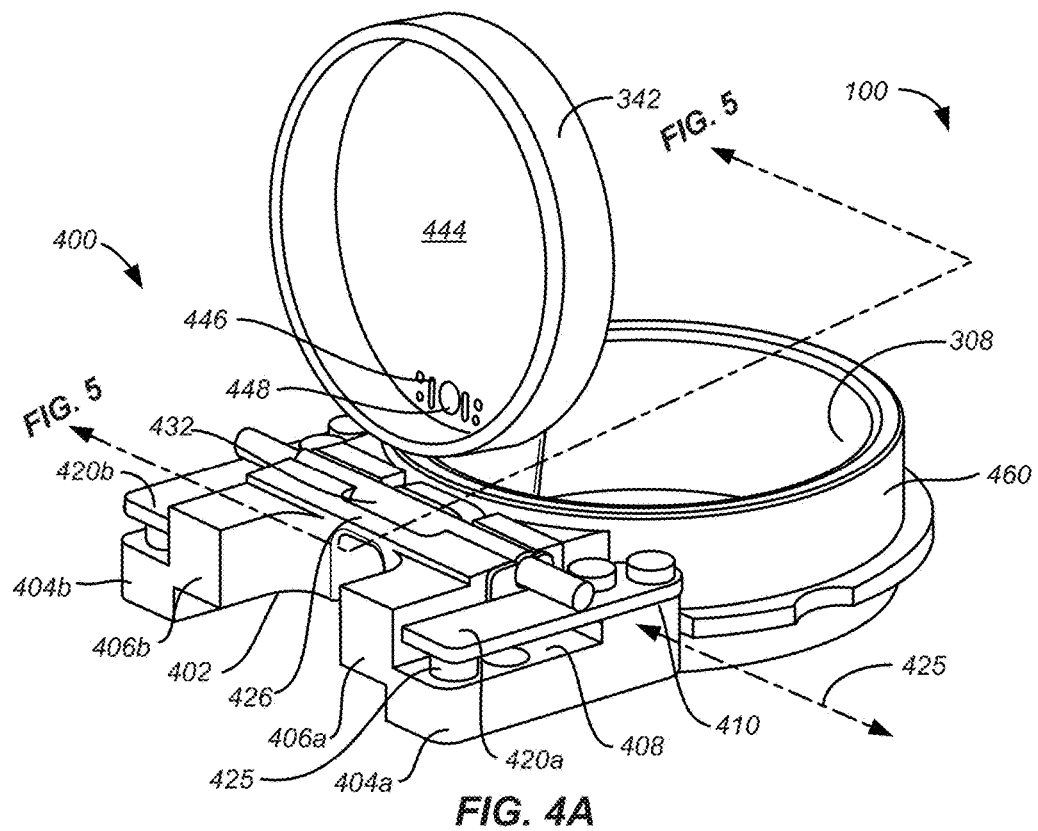
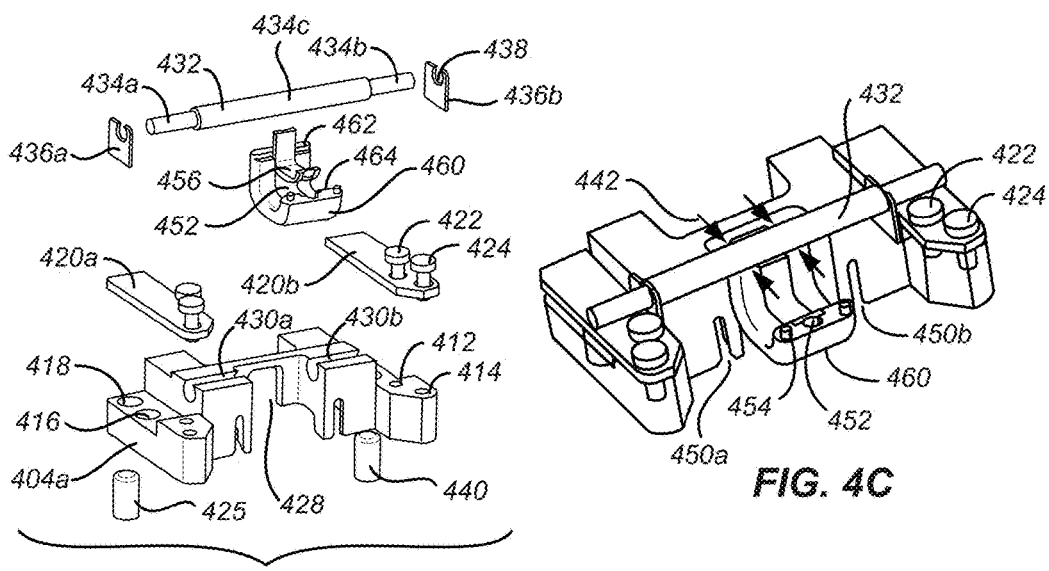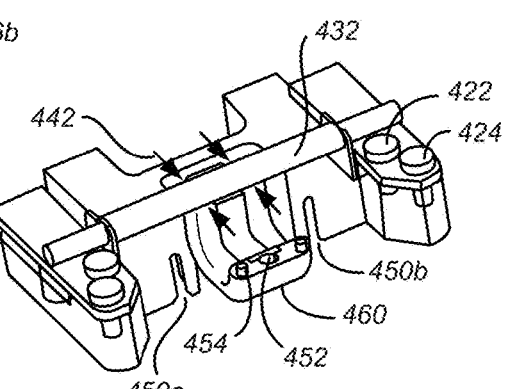

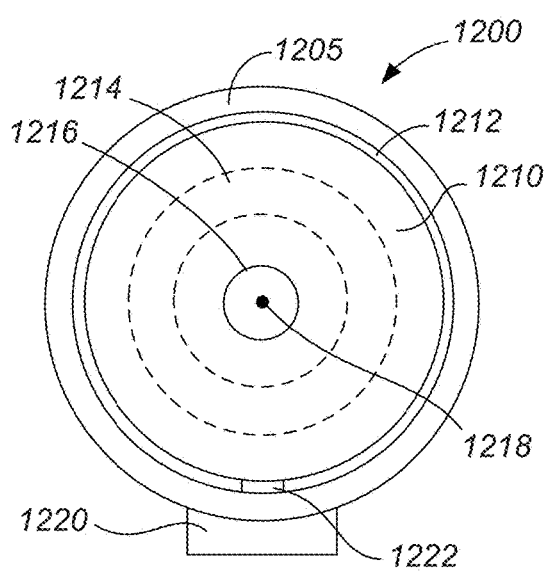
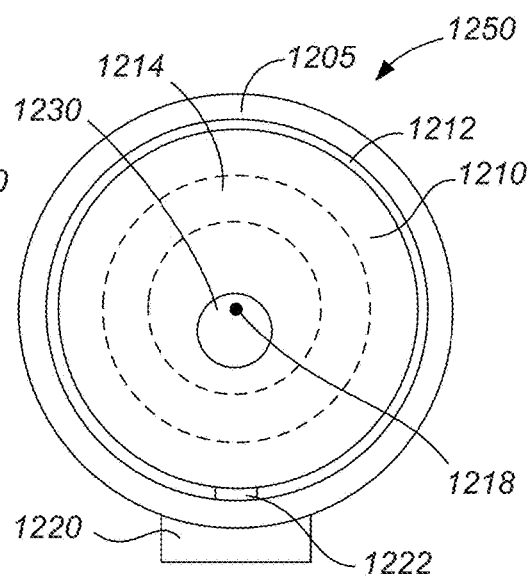
FIG. 12A  FIG. 12B
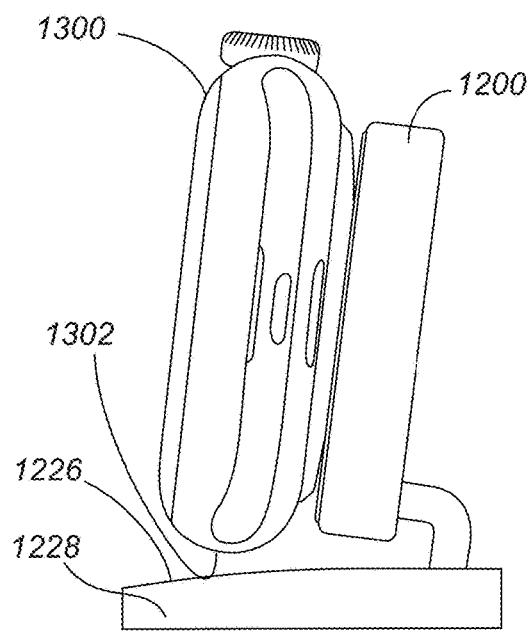
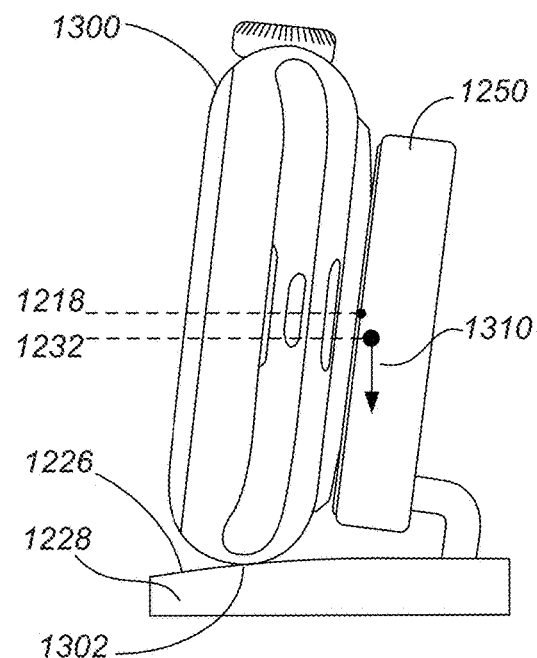
FIG. 13A  FIG. 13B

WIRELESS CHARGER FOR AN ELECTRONIC DEVICE

CROSS-REFERENCES TO RELATED APPLICATION

This application claims priority to U.S. Provisional Patent Application No. 62/215,659 filed on Sep. 8, 2015, and incorporated by reference herein in its entirety for all purposes. This application is related to concurrently filed U.S. Non-Provisional patent application Ser. No. 14/946,619, which is also incorporated by reference herein in its entirety for all purposes.

FIELD

The present disclosure relates generally to wirelessly charging electronic devices, and more particularly, to systems and methods that enable an electronic device to be wirelessly charged in more than one position.

BACKGROUND

Many portable electronic devices include one or more rechargeable batteries that require external power to recharge from time to time. These devices may include cell phones, smart telephones, wearable devices, navigation devices, sports devices, health devices, accessory devices, and so on.

Some portable electronic devices with rechargeable batteries, including some wrist-worn wearable electronic devices include an inductive charging system or other type of wireless charging system. In an inductive charging system, a user may place the electronic device on an inductive charging surface to replenish the internal battery without the need for plugging the device into a charging cable. The inductive charging surface, and the associated electrical components that enable inductive charging, may be incorporated into a docking station or similar charging device that can be placed in a location (e.g. on night stand, an office desk, or similar location) where a user will regularly charge the portable electronic device. Accordingly, aesthetically pleasing, well-designed docking stations and wireless charging devices are desirable.

SUMMARY

Some embodiments of the disclosure pertain to a system for wirelessly charging a portable electronic device. The system can be a docking station or similar device upon which the portable electronic device to be charged can be placed. The system can include a power transmitting component that can be wirelessly connected to charging circuitry of the portable electronic device to wirelessly transmit power to the charging circuitry and charge the portable electronic device's battery. In some embodiments the power transmitting component is housed in an assembly attached to a base of the system with a hinge. The hinge enables the wireless charging assembly to be positioned at more than one angle with respect to the base enabling the user to change the viewing angle of the portable electronic device being charged by the power transmitting component. For example, the wireless charging assembly can be placed in a first substantially flat position in which the portable electronic device can be placed directly over the wireless charging assembly as well as a second angled position that enables the portable electronic device to be positioned at an angle against the wireless charging assembly. The first substantially flat position may enable a user to easily view information presented, for example, on a display screen of the portable electronic device the display, when looking down towards the device, while the second, angled position may better enable the user to view information presented on the display screen from other perspectives.

According to some embodiments, a wireless charger for an electronic device is provided. The wireless charger can include a base having a base opening and an interior cavity defined by an upper shell, a lower shell and an inner sidewall extending between the upper and lower shells to define the base opening. An aperture can be formed through the inner sidewall between the interior cavity and the base opening. The wireless charger can further include a wireless charging assembly and a hinge that connects the base to the wireless charging assembly. The hinge can be pivotably attached to the base within the interior cavity so that it is generally hidden from view and can be moveable between a first position in which the wireless charging assembly is disposed within the base opening and a second position in which the wireless charging assembly extends outside the base opening. The charging assembly may include a charging surface and a power transmitting unit disposed adjacent to the charging surface that is configured to wirelessly transmit power across the charging surface to a power receiving unit of a portable electronic device.

In some embodiments the hinge can have a u-shaped stem that extends through the aperture where the stem includes a first end connected to a structure within the interior cavity of the base, a second end connected to the wireless charging assembly and a u-shaped portion between the first and second ends. The stem can also include a covered groove extending through the u-shaped portion and open at the second end of the stem to route one or more wires in a hidden manner through the stem.

According to some embodiments, a wireless charger for an electronic device is provided that includes a donut-shaped base having an upper surface, a planar bottom surface and an inner sidewall extending between the upper surface and the bottom surface that defines a central base opening through the base. The base can further include an interior cavity defined at least in part by the upper surface, the bottom surface and the inner sidewall, and an aperture can be formed through the inner sidewall between the interior cavity and the central base opening. The wireless charger can further include a wireless charging assembly and a hinge that connects the base to the wireless charging assembly. The hinge can be pivotably attached to the base within the interior cavity so that it is generally hidden from view and can be moveable between a first position in which the wireless charging assembly is disposed within the base opening and a second position in which the wireless charging assembly extends outside the base opening. The charging assembly can have a housing, a charging surface, and a power transmitting unit disposed within the housing and adjacent to the charging surface and configured to wirelessly transmit power across the charging surface to a power receiving unit of a portable electronic device.

In some embodiments the wireless charging assembly can further include one or more features that assist with alignment of the power transmitting unit to the power receiving unit of a portable electronic device including a charging surface having a concave shape and/or at least one magnet to assist with alignment of the power transmitting unit to the power receiving unit of a portable electronic device. Additionally, in some embodiments the power transmitting unit can be moveable within housing to further improve alignment of the power transmitting unit to the power receiving unit of a portable electronic device.

According to some embodiments, a wireless charger for an electronic device is provided where the charger includes a circular base having an interior cavity defined by an upper shell, a lower shell and a ring extending between the upper and lower shells. The upper shell can include a first central circular opening, a first rim formed around a perimeter of the upper shell and a continuously curved surface extending from the first rim to the first central circular opening. The lower shell can include a second central circular opening, a second rim spaced adjacent to and attached to the first rim and formed around a perimeter of the lower shell, a substantially planer surface surrounding the second central circular opening and a curved surface extending between the substantially planer surface and the second rim. The ring can include an interior sidewall surface that defines a base opening through the base concentric with the first and second central circular openings. An aperture can be formed through the interior sidewall of the ring between the interior cavity and the opening through the base, and a hinge that extends through the aperture can be connected to the base within the interior cavity. The wireless charging assembly can be pivotably attached to the base by the hinge and moveable between a first position in which the wireless charging assembly is disposed within the base opening parallel with the upper annular surface of the ring and a second position in which the wireless charging assembly is disposed outside the base opening. The charging assembly can include a housing, a concave charging surface, and a power transmitting unit disposed within the housing and adjacent to the concave charging surface, the power transmitting unit configured to wirelessly transmit power across the concave charging surface to a power receiving unit of a portable electronic device.

In some embodiments of the disclosure, in the first position the charging assembly is aligned with and parallel to a top of the opening and in the second position, the charging assembly is inclined at a 90 degree angle or less with respect to the base. As examples of the second position, the charging assembly can be angled at any desired angle and in some instances can be inclined at a near vertical angle of between 80 and 89 degrees with respect to the bottom surface. As other examples of the second position, the charging assembly can be angled between 85 and 89 degrees or between 87 and 88 degrees. In some embodiments, the charging assembly may also be placed at intermediate angles in between the first and second positions.

According to some embodiments, a hinge assembly is provided that can pivot between first and second positions. The hinge assembly can include a pin block having a pin receiving groove formed at an upper surface and a footing including a shelf and a seat elevated with respect to the shelf; a friction beam attached to the seat of the footing and extending over the shelf of the footing; a rotatable pin disposed within the pin receiving groove, the rotatable pin including a section extending between the shelf and the friction; a tensioner operatively coupled between the friction beam and the shelf of the footing to press the friction beam against the section the rotatable pin; and a stem coupled to the rotatable pin such that the stem rotates with the rotatable pin.

According to some embodiments, a hinge assembly includes a pin block having a pin receiving groove formed at an upper surface and first and second opposing footings, each footing including a shelf and a seat elevated with respect to the shelf; a first friction beam attached to the seat of the first footing and extending over the shelf of the first footing; a second friction beam attached to the seat of the second footing and extending over the shelf of the second footing; a rotatable pin disposed within the pin receiving groove, the rotatable pin having first and second opposing ends with the first end extending between the shelf of the first footing and the first friction beam and the second end extending between the shelf of the second footing and the second friction beam; a first tensioner operatively coupled between the first friction beam and the shelf of the first footing to press the first friction beam against the first end of the rotatable pin; a second tensioner operatively coupled between the second friction beam and the shelf of the second footing to press the second friction beam against the second end of the rotatable pin; and a stem coupled to the rotatable pin between the first and second supports such that the stem rotates with the rotatable pin.

In some embodiments the pin block can further include one or more of: a cutout between the first and second footings that allows stem to rotate within the cutout; and first and second supports spaced apart from each other, where the first support is positioned adjacent to the first footing, the second support is positioned adjacent to the second footing and the pin receiving groove includes a first portion in the first support and a second portion in second support. In some embodiments the stem includes a first end attached to the rotatable pin, a second end and a u-shaped portion between the first and second ends and a channel extending along a length of the stem through the u-shaped section and a u-shaped cap covering the channel.

In some embodiments each of the first and second tensioners are configured to adjust the level of friction applied by its respective friction beam to the rotatable pin, and in some instances each of the first and second tensioners can be a screw threadably coupled to a through hole formed in the first and second shelves, respectively.

According to some embodiments, a hinge assembly is provided that includes a pin block having: first and second opposing footings, each footing including a shelf and a seat elevated with respect to the shelf; first and second opposing supports between the first and second footings, the first support adjacent to the first footing and the second support adjacent to the second footing; a first pin receiving groove at an upper surface of the first support; a second pin receiving groove at an upper surface of the second support aligned with the first pin receiving groove; and a bridge extending between the first and second supports. The hinge assembly can further include a first clip attached to the first support and having a first aperture opening aligned with the first pin receiving groove; a second clip attached to the second support and having a second aperture aligned with the second pin receiving groove; a rotatable pin extending across the first and second supports within the first and second pin receiving grooves, the rotatable pin having first and second opposing ends and a central section between the opposing ends, wherein the rotatable pin is positioned so that the first end extends through the first aperture of the first clip over the first shelf and the second end extends through the second aperture over the second shelf; a first friction beam attached to the seat of the first footing and extending over the first shelf between the first shelf and the first end of the rotatable pin; a second friction beam attached to the seat of the second footing and extending over the second shelf between the second shelf and the second end of the rotatable pin; a first tensioner operatively coupled between the first friction beam and the first shelf to force the first friction beam against the first end of the rotatable pin; a second tensioner operatively coupled between the second friction beam and the second shelf to force the second friction beam against the second end of the rotatable pin; and a stem coupled to the rotatable pin between the first and second supports such that the stem rotates with the rotatable pin.

The following detailed description together with the accompanying drawings in which the same reference numerals are sometimes used in multiple figures to designate similar or identical structural elements, provide a better understanding of the nature and advantages of the present disclosure.

BRIEF DESCRIPTION OF THE DRAWINGS

FIG. 4A is a simplified rear perspective view of a hinge according to some embodiments of the disclosure;

FIG. 4B is a front perspective exploded view of a portion of the hinge shown in FIG. 4A;

FIG. 4C is front perspective view of the of the hinge shown in FIG. 4A;

FIG. 12A illustrates a center position of an alignment and retention magnet for a wireless charger according to some embodiments of the disclosure;

FIG. 12B illustrates an off-center position of an alignment and retention magnet for a wireless charger according to some embodiments of the disclosure;

FIG. 13A is a simplified side view of a portable electronic device in a near vertical charging position on a wireless charger according to some embodiments of the disclosure;

FIG. 13B is a simplified side view of a portable electronic device in a near vertical charging position on a wireless charger according to some embodiments of the disclosure;

Reference will now be made in detail to representative embodiments illustrated in the accompanying drawings. It should be understood that the following descriptions are not intended to limit the embodiments to any particular preferred embodiment. To the contrary, it is intended to cover alternatives, modifications, and equivalents as can be included within the spirit and scope of the described embodiments as defined by the accompanying claims.

DETAILED DESCRIPTION

Some embodiments of the disclosure pertain to a system for wirelessly charging a portable electronic device. The system can be a docking station or similar device upon which the portable electronic device to be charged can be placed. The system can include a power transmitting component that can be wirelessly connected to charging circuitry of the portable electronic device to wirelessly transmit power to the charging circuitry and charge the portable electronic device's battery.

User's often receive messages and other information via portable electronic devices that the user may want to readily view even while the portable electronic device is charging. A charging system according to some embodiments of the disclosure includes a wireless charging assembly attached to a base with a hinge. The wireless charging assembly includes a power transmitting component and the hinge enables the wireless charging assembly to be positioned at more than one angle with respect to the base enabling the user to change the viewing angle of the portable electronic device being charged by the power transmitting component. For example, the wireless charging assembly can be placed in a first substantially flat position in which the portable electronic device can be placed directly over the wireless charging assembly and a second angled position that enables the portable electronic device to be positioned at an angle against the wireless charging assembly that may provide a better viewing angle for the user of received messages and other information.

Figure 1A:
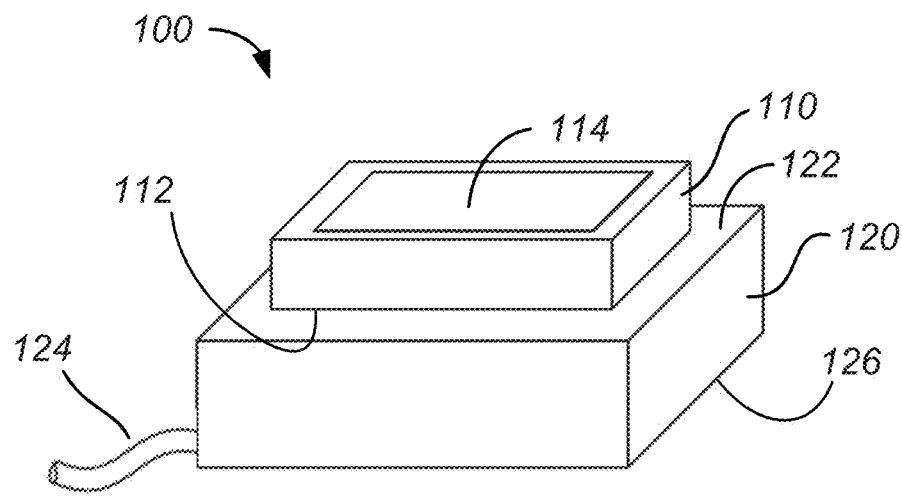
FIG. 1A is a simplified front isometric view illustrating a system for wirelessly charging a portable electronic device having its charging surface in a first position according to some embodiments of the disclosure.

FIG. 1A is a front isometric view illustrating a system 100 that enables a portable electronic device to be wirelessly charged. The system may include a portable electronic device 110, such as a wearable electronic device, and a wireless charger 120, such as a docking station. Although FIG. 1 illustrates the portable electronic device 110 and the wireless charger 120 as specific devices having particular shapes and sizes relative to each other, the illustrated devices merely serve as an example. In various implementations, either the portable electronic device 110 or the wireless charger 120 may be a variety of different types of electronic devices having a variety of different shapes and/or sizes provided that wireless charger 120 is configured to wirelessly charge a battery or other power source within portable electronic device 110. For example, portable electronic device 110 may be a tablet computer, a mobile computing device, a smart phone, a cellular telephone, a digital media player, or a variety of different types of wearable electronic devices. One example of a wearable device that portable electronic device 120 may represent can be worn on a user's wrist like a watch and include a display to indicate the date and time, but can also do much more than act as a simple time piece. For example, the device may include may also include accelerometers and one or more sensors that enable a user to track fitness activities and health-related characteristics, such as heart rate, blood pressure, and body temperature, among other information. Similarly, wireless charger 120 may be a stand-alone dock or may be incorporated into another electronic device, such as a stereo receiver, a clock radio, or other device.

As illustrated, portable electronic device 110 includes a first connection surface 112 that is operable to contact a charging surface 122 of wireless charger 120. In some cases, the first connection surface 112 and charging surface 122 form a sliding interface between the portable electronic device 110 and the wireless charger 120. As such, the two devices may be positionable with respect to each other in one or more directions.

Wireless charger 120 includes a power transmitting component (not shown) within its housing that is positioned adjacent to charging surface 122. The power transmitting component can wirelessly transmit power across charging surface 122 to portable electronic device 110 to charge one or more batteries or other power sources within the portable electronic device. In order to provide power to the power transmitting component, wireless charger 120 can receive power from an external source through a cable 124 or other connection or can include its own power source, such as a battery (not shown).

Portable electronic device 110 can include a display 114 or other medium through which information, such as the date and time, phone calls, text messages, emails and other alerts may be displayed. As illustrated in FIG. 1A, when charging surface 122 lies in a plane parallel to a bottom 126 of wireless charger 120, portable electronic device 110 may lie in an essentially flat position over wireless charger 120 making display 114 difficult for a user to see unless the user is looking at portable electronic device 110 and wireless charger 120 from above. Thus, while in some instances a user will prefer to charge portable electronic device 110 while it is lying flat on charging surface 122, in other instances it may be desirable for portable electronic device 110 to be inclined at an angle to facilitate viewing of display 114 from angles other than above device 110.

Figure 1B:
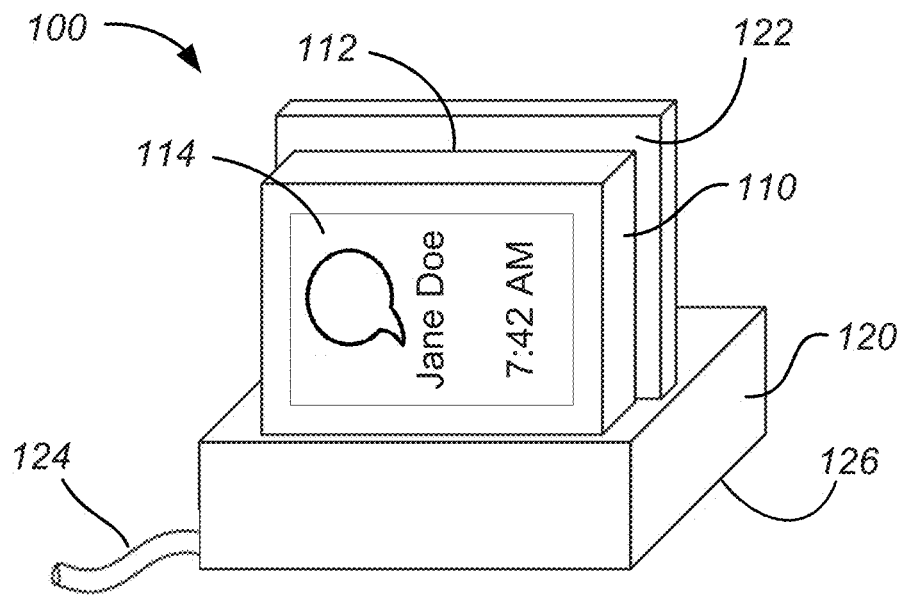
FIG. 1B is a simplified front isometric views illustrating the system for wirelessly charging a portable electronic device shown in FIG. 1A having its charging surface in a second position.

FIG. 1B is a front isometric view of system 100 with charging surface 122 positioned at an incline or angle with respect to the bottom 126 of electronic device 120 thus enabling portable electronic device 110 to be wirelessly charged in a position that may facilitate viewing information on display 114. According to embodiments of the disclosure, charging surface 122 can be part of a charging assembly that is connected to a base portion of wireless charger 120 with a hinge as described more fully below. The hinge can be hidden beneath an exterior surface of the base portion of electronic device 120 for an aesthetically pleasing look while enabling charging surface 122 to be moved between the substantially flat position shown in FIG. 1A and the inclined position shown in FIG. 1B. Details of some suitable hinges are described below with respect to FIGS. 4A-4C and 15A-15G.

Figure 2:
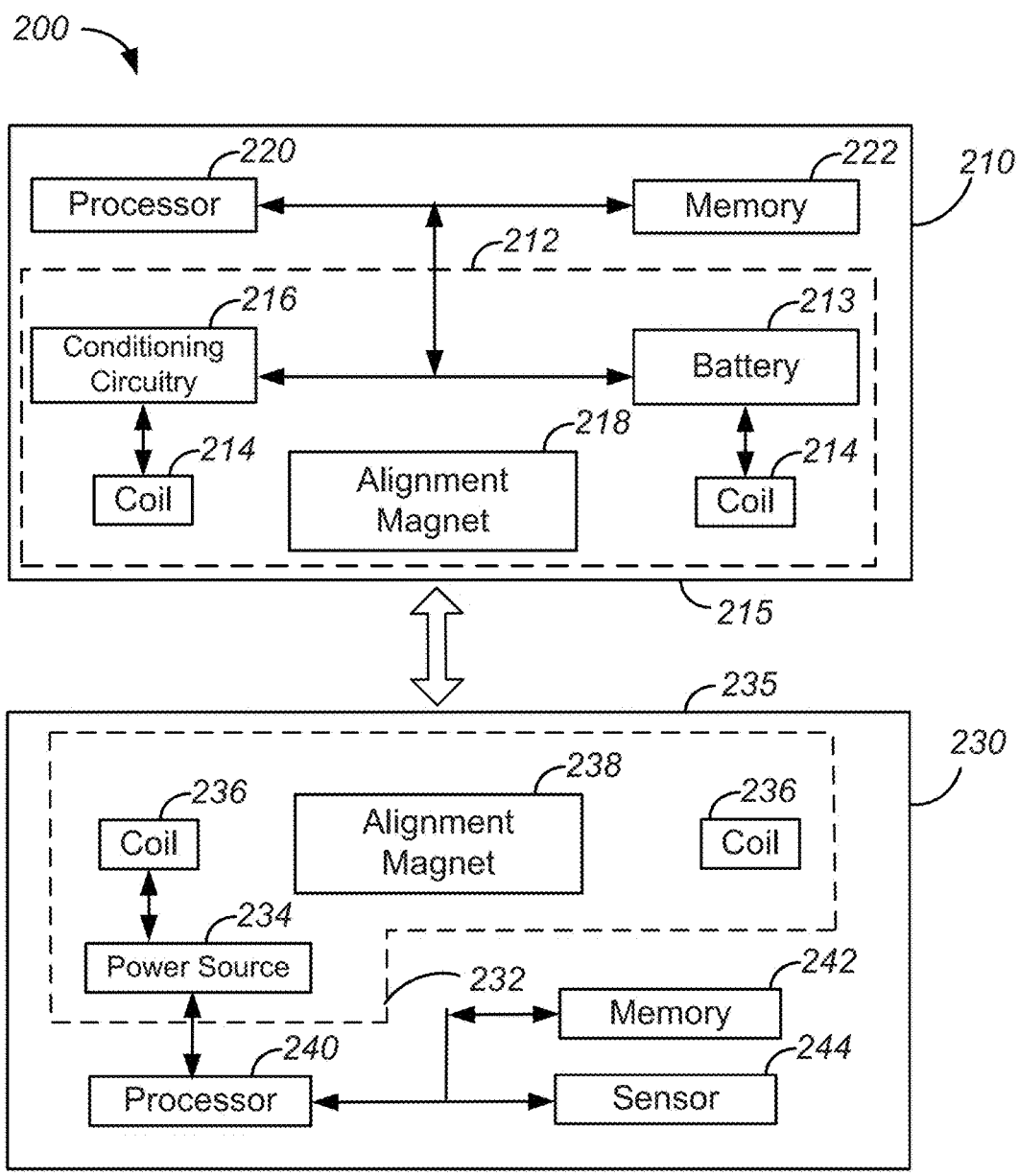
FIG. 2 is a block diagram of inductive charging circuitry and related circuitry within the devices shown in FIGS. 1A and 1B according to some embodiments of the disclosure.

FIG. 2 is a simplified block diagram of various power-related components in a system 200 that includes a portable electronic device 210 and a wireless charger 230. System 200 can be representative of system 100. Portable electronic device 210 can be, for example, device 110 or device 1000 discussed below. Wireless charger 230 can be, for example, wireless charger 120 discussed above or device 300 discussed below.

As shown in FIG. 2, portable electronic device 210 includes an inductive power-receiving component 212 while wireless charger 230 includes a power-transmitting component 232. In system 200, power receiving component 212 can be operatively coupled to power transmitting component 232 to charge a battery 213 within the portable electronic device. Within the power receiving component, battery 213 is operably connected to a receive coil 214 via power conditioning circuitry 216. Receive coil 214 can be inductively coupled to a transmit coil 236 of wireless charger 230 to receive power wirelessly from the charger and pass the received power to battery 213 within the portable electronic device via power conditioning circuitry 216.

Power conditioning circuitry 216 can be configured to convert alternating current received by the receive coil 214 into direct current power for use by other components of portable electronic device 210. Also within device 210, a processing unit 220 may direct the power, via one or more routing circuits and under the execution of an appropriate program residing in a memory 222, to perform or coordinate one or more functions of the portable electronic device typically powered by battery 213.

Within wireless charger 230, power transmitting component 232 includes a power source 234 operatively coupled to transmit coil 236 to transmit power to portable electronic device 210 via electromagnetic induction or magnetic resonance. Transmit coil 236 can be an electromagnetic coil that produces a time-varying electromagnetic flux to induce a current within an electromagnetic coil within the portable electronic device (e.g., coil 214). The transmit coil may transmit power at a selected frequency or band of frequencies. In one example the transmit frequency is substantially fixed, although this is not required. For example, the transmit frequency may be adjusted to improve power transfer efficiency for particular operational conditions. More particularly, a high transmit frequency may be selected if more power is required by the accessory and a low transmit frequency may be selected if less power is required by the accessory. In other examples, transmit coil 236 may produce a static electromagnetic field and may physically move, shift, or otherwise change its position to produce a spatially-varying electromagnetic flux to induce a current within the receive coil.

When portable electronic device 210 is operatively attached to wireless charger 230 (e.g., by aligning connection surface 215 of device 210 with charging surface 235 of wireless charger 120), the portable electronic device may use the received current to replenish the charge of its rechargeable battery or to provide power to operating components associated with the electronic device. Thus, when portable electronic device 210 is operatively attached to wireless charger 230, the charger may wirelessly transmit power at a particular frequency via transmit coil 236 to receive coil 214 of the portable electronic device.

Transmit coil 236 can be positioned within the housing of wireless charger such that it aligns with receive coil 214 in the portable electronic device along a mutual axis when the charger is operatively attached to portable electronic device. If misaligned, the power transfer efficiency between the transmit coil and the receive coil may decrease as misalignment increases. The housing of the portable electronic device and the wireless charger can be designed to facilitate proper alignment between connection surface 215 and charging surface 235 to ensure high charging efficiency. In some embodiments of the disclosure, transmit coil 236 is moveable within the housing such that it can be accurately positioned to align with receive coil 214 of different sized portable electronic devices 210 as described in more detail below in conjunction with FIGS. 14A and 14B.

As also discussed below, in some embodiments, one or more alignment assistance features can be incorporated into the devices to facilitate alignment of the transmit and receive coils along the mutual axis can be employed. As one example, an alignment magnet 238 can be included in wireless charger 230 that magnetically mates with an alignment magnet 218 of portable electronic device 210 to facilitate proper alignment of the portable electronic device and wireless charger. Additionally, the connection and charging surfaces 215, 235 of portable electronic device 210 and wireless charger 230, respectively, may cooperate to further facilitate alignment. For example, in one embodiment connection surface 215 of portable electronic device 210 has a convex shape while charging surface 235 of wireless charger 230 has a concave shape (e.g., see charging surface 344 shown in FIG. 5) following the same curvature as connection surface 215 of device 210. In this manner, the complementary geometries may facilitate alignment of the device charger and wearable device in addition to the alignment magnets.

Wireless chargers, such as chargers 120 and 230, may be regularly used to charge one or more portable electronic devices, such as devices 110 and 210. The wireless charger may be placed in prominent location within a user's home or office and used on a daily basis. Thus, the user experience associated with the charger along with the aesthetic appearance of the charger can be important. FIGS. 3A-3D are illustrations of a wireless charger 300 according to some embodiments of the disclosure. As shown in the figures, wireless charger 300 includes a generally circular base 302 having a curved upper surface 304 spaced apart from a planar bottom surface 306 that allows wireless charger 300 to be placed on a level surface such as the top of a desk, an end table or a nightstand. Base 302 further includes an opening 320 that extends fully through the base from upper surface 304 to bottom surface 306.

An interior sidewall surface 308 of the base (see FIG. 3B) defines the shape and size of opening 320 and is surrounded by an annular surface 305 that is slightly recessed from upper surface 304. In some embodiments and as described below, interior sidewall surface 308 is part of a single piece annular ring (e.g., ring 460 shown in FIG. 4A) that extends from upper surface 304 to bottom surface 306 and where an upper surface of the ring forms annular surface 305. Upper surface 304 can have a continuous curvature from an outer edge of annular surface 305 to an upper inner edge of a rim 310 that extends along the perimeter of base 302. An annular curved lower surface 307 (see FIG. 3D) extends between planar bottom surface 306 and a lower inner edge of rim 310.

A wireless charging assembly 340, which is connected to base 302 by a hinge, is positioned within opening 320. Except for a stem that connects the wireless charging assembly to the base, the hinge is positioned entirely within the interior of base 302 and is thus hidden from view. Charging assembly 340 includes a housing 342 and an charging surface 344. In the embodiment shown, charging surface 344 can have a concave shape that matches a convex shape of a connection surface of a portable electronic device that the wireless charger is designed to charge, such as wearable electronic device 1000 that is worn on a user's wrist and described with respect to FIGS. 10A and 10B below. Charging surface 344 can be surrounded by a generally flat annular surface 346.

Figure 3A:
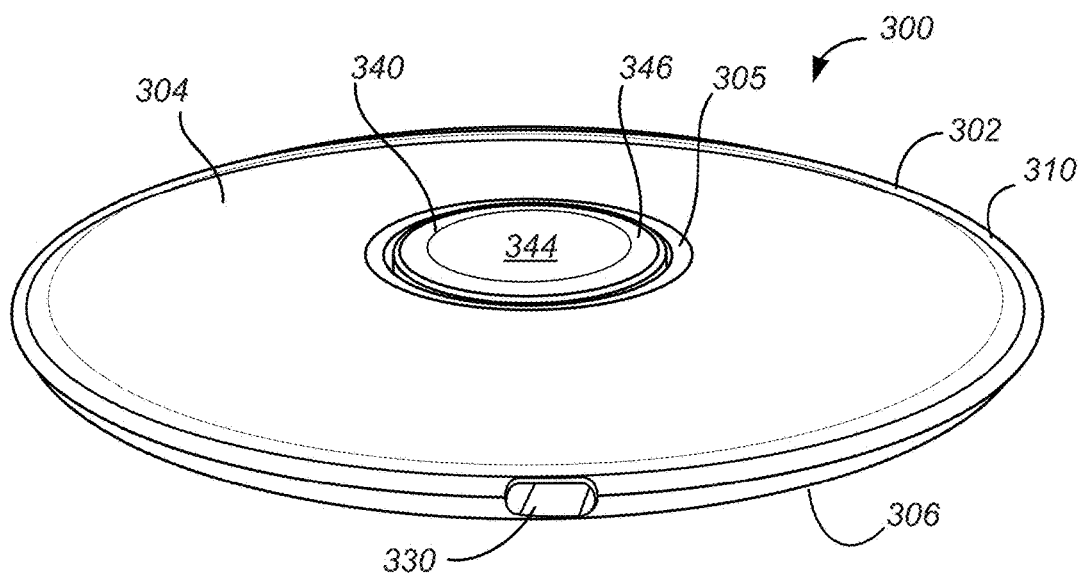
FIG. 3A is a perspective view of a wireless charger according to some embodiments of the disclosure.
Figure 3B:
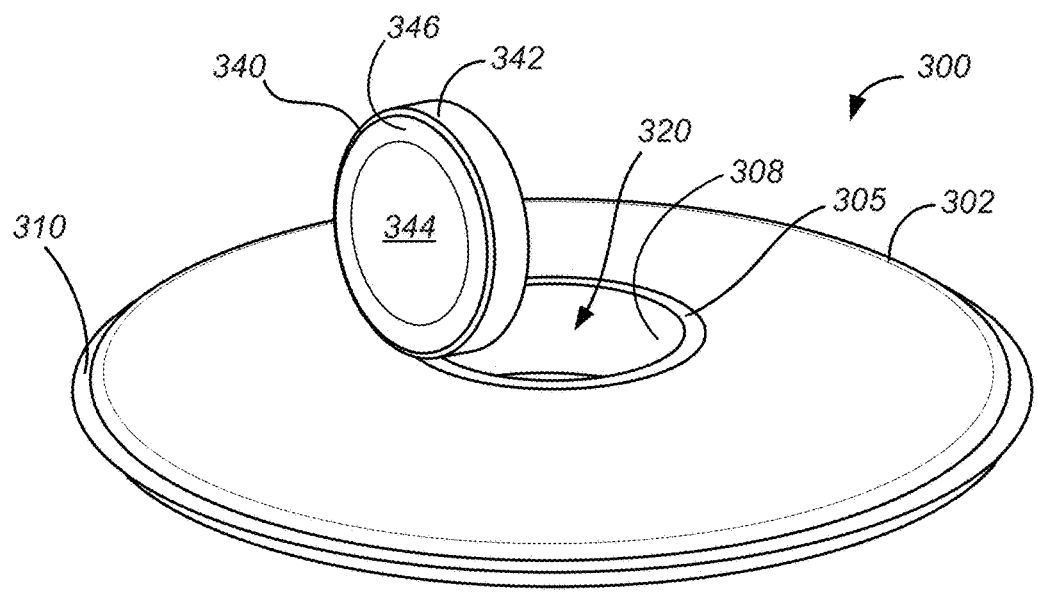
FIG. 3B is a perspective view of the wireless charger shown in FIG. 3A with a wireless charging assembly in an up position.
Figure 3C:
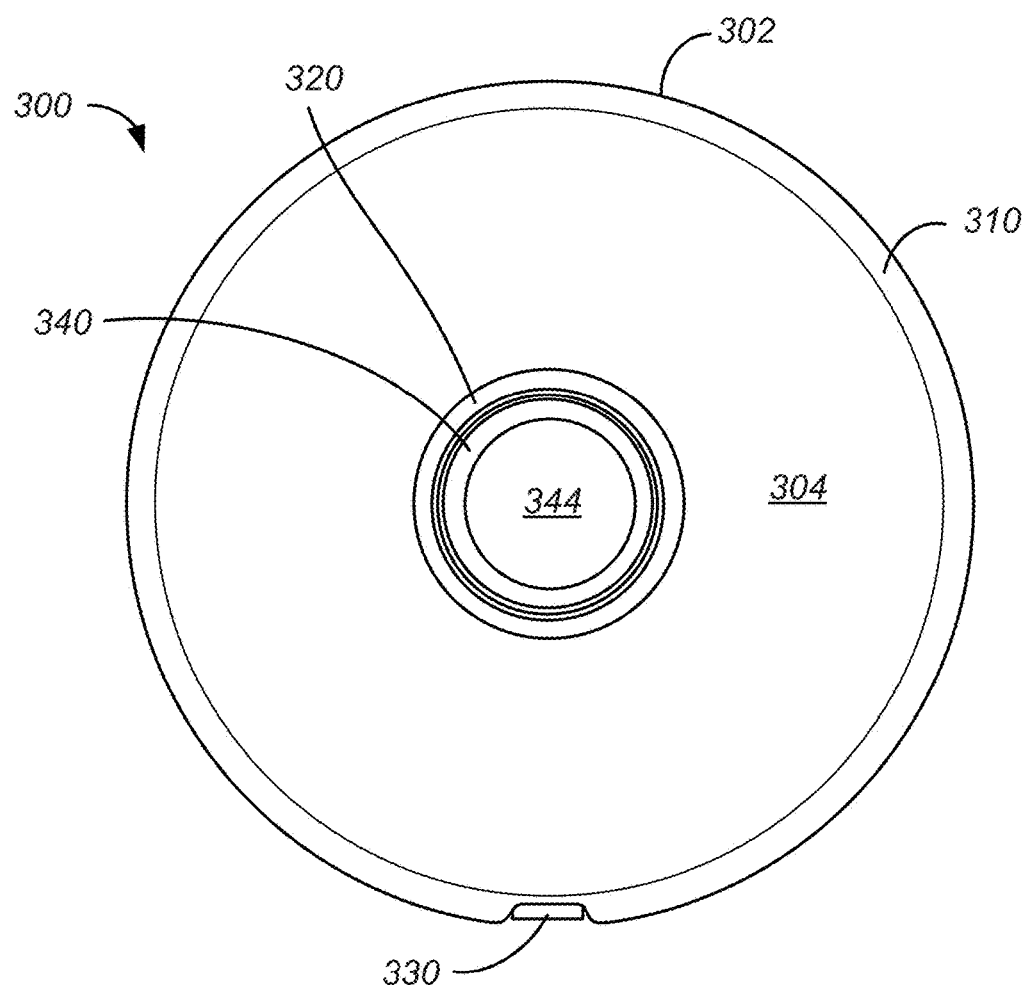
FIG. 3C is a top plan view of the wireless charger shown in FIG. 3A.
Figure 3D:
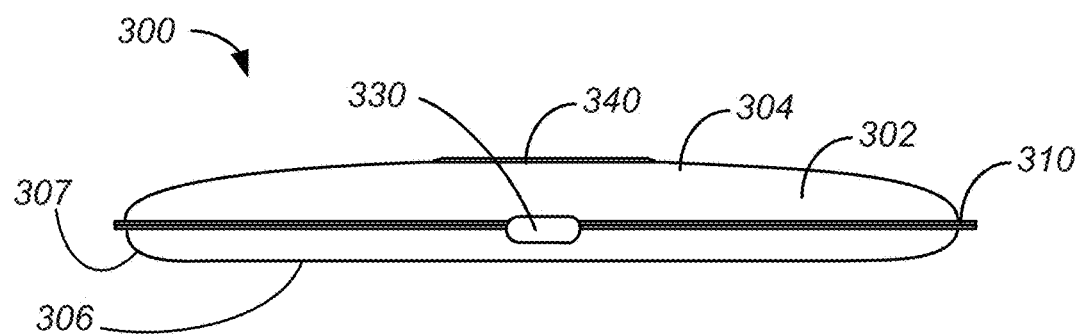
FIG. 3D is a side plan view of the wireless charger shown in FIG. 3A.

FIG. 3A is a perspective view of wireless charger 300 with charging assembly 340 in a down position, while FIGS. 3C and 3D are top and side plan views, respectively, of charger 300 with charging assembly 340 in the down position. As illustrated in these figures, in the down position, charging surface 344 of charging assembly 340 is generally aligned with the uppermost portion of curved upper surface 304. The vertical alignment of charging surface 344 with surface 304 that defines an exterior surface of base 302 allows a portable electronic device that is positioned on charging surface 344 in a proper charging alignment to extend over a portion surface 304 without interrupting contact between the connection surface of the portable electronic device (e.g., surface 112 or 215) and the charging surface. Also if, for example, the portable electronic device being charged is a wrist-worn wearable device with a flexible band, the continuous curvature of surface 304 allows the band to drape along surface 304 in an attractive, natural position.

In the up position, illustrated in FIG. 3B, charging assembly 340 can be inclined at an angle that enables a user to more easily see a display of a portable electronic device that is being charged by wireless charger 300 from certain angles. For example, if wireless charger 300 is positioned on a bed side table, it may be easier for a user laying on the bed to view the display of a portable electronic device being charged by the charger when the charging assembly is in the up position than the down position.

In some embodiments, the hinge (not shown in FIGS. 3A-3D) that allows charging assembly 300 to pivot in and out of opening 320 has a stop that prevents charging assembly 340 from being inclined at an angle of more than 90 degrees. And, in some embodiments the stop angle can between 80 and 89 degrees, between 85 and 89 degrees or between 87 and 88 degrees, all of which provide a near vertical alignment that, in turn, provides an excellent viewing angle for a user from many different locations in which the down position may not provide an ideal viewing angle. The near vertical but less than 90 degree angle also secures the portable electronic device in a position in which it is less likely to tip over, away from the charging assembly than would be the case with a 90 degree or greater angle. Additionally, if the portable electronic device being charged is a wrist-worn wearable device with a flexible band, the continuous curvature of surface 304 and the near vertical alignment of the charging assembly allows the side surfaces of the band to contact surface 304 on the sides of and behind opening 320 providing additional support for the wrist-worn portable electronic device.

When inner sidewall 308 is part of an annular ring, the ring can be made out of a hard metal such as stainless steel and annular surface 305, which can be an upper surface of the metal ring, can be slightly recessed to provide protection against scratches or similar abrasions. In some embodiments surface 305 can be a highly polished surface for aesthetic and other purposes. To reduce a visual presence of a seam where surface 305 joins inner sidewall 308, the inner sidewall can be lightly blasted using a bead blasting or other appropriate technique. Roughening inner surface 308 has the added benefit for some embodiments of reducing reflections along the surface the sidewall thus making it more difficult to see through the gap between inner sidewall 308 and the outer edge of housing 342 when the charging assembly is in the down position to a table or other surface that the charger is positioned on. In some embodiments, the ring can have an annular step (not shown) formed along inner sidewall 308 that reduces the diameter of opening 320 in the stepped region. The step can extend under wireless charging assembly 340 providing a stop for the wireless charging assembly in the down position and eliminating the ability to see through opening 320 when the charging assembly is down. In some other embodiments inner sidewall 308 of the ring can have a slight inward angle such that opening 320 has a larger diameter at upper surface 304 than at lower surface 306. Depending on the angle this design feature can reduce the ability to see through the gap formed between the edge of the ring and the wireless charging assembly in opening 320 when the charging assembly is in the down position (i.e., reduce the difference between the diameter of housing 342 and the portion of inner sidewall 308 near bottom 306) or eliminate it altogether.

Wireless charger 300 can further include a receptacle connector 330. In some embodiments connector 300 can be compatible with a reversible lightning connector manufactured by Apple, Inc., the assignee of the present disclosure. The lightning connector includes both power and data contacts along with circuitry that can participate in a handshaking algorithm with circuitry associated with connector 330 to authenticate the cable that is mated with connector 330 to ensure it was designed to operate with charger 300. In other embodiments, connector 330 can be any connector that delivers power to charger 300.

A variety of different hinges can be incorporated into wireless charger 300 to enable charging assembly 340 to rotate between down and up positions and/or be set at various intermediate positions therebetween. One such hinge mechanism that can connect charging assembly 340 to base 302 in a manner in which the hinge is generally hidden from a user's view is described below with respect to FIGS. 4A-4C. FIG. 4A is a simplified perspective view of a hinge 400 according to some embodiments of the disclosure along with a ring 460 that includes interior sidewall surface 308 of base 302 previously described. In FIG. 4A, hinge 400 is connected to housing 342 of charging assembly 340 with the charging assembly in the up position. Hinge 400 includes a pin block 402 having first and second opposing footings 404a, 404b and first and second opposing supports 406a, 406b between the first and second footings. Each of the footings 404a, 404b can include a shelf 408 and a seat 410 that is adjacent to and elevated above shelf 408.

Referring to FIG. 4B, which is a perspective exploded view of a portion of hinge 400, through holes 412, 414 are formed through each seat 410 and through holes 416, 418 are formed through each shelf 408. First and second friction beams 420a, 420b are attached at a proximal end to their respective seat 410. Each friction beam extends from seat 410 of its respective footing over its respective shelf 408. Since each seat 410 is elevated above its respective shelf 408, in the absence of an applied force as described below, a distal end of each friction beam 420a, 420b is spaced apart from its underlying shelf by a distance equal to the height that seat 410 is elevated above shelf 408. Friction beams 420a, 420b can be attached to their respective footing by fasteners 422, 424 that extend through holes 412, 414, respectively, formed in the seats 410. In some embodiments, each of the through holes 412, 414 are threaded and fasteners 422, 424 can be attached screws.

In some embodiments, hinge 400 fits within cutouts formed within the base of a wireless charger, such as charger 300, align and secure the hinge to the base. Additionally, in some embodiments, hinge 400 can be attached to the base by one or more through holes in the footings 404a, 404b. For example, an alignment post (not shown) can extend from the base into through holes 416 in each of the footings 404a, 404b to secure and align the pin block to the base. In some embodiments, the pin block can be attached to the base by fasteners, such as screws, that extend through holes 416.

Support 406a is adjacent to footing 404a and support 406b is adjacent to footing 404b. While supports 406a, 406b are positioned inside of footings 404a, 404b in the embodiment shown in FIGS. 4A-4C, in other embodiments, the supports can be positioned outside the footings or at other locations relative to the footings. A bridge 426 extends between and connects support 406a to support 460b, and each of the supports includes a groove 430a, 430b at its upper surface. A pin 432 is positioned adjacent to bridge 426 and extends across the two supports within grooves 430a, 430b, which are aligned allowing the pin to rotate within the grooves.

Pin 432 has first and second end portions 434a, 434b and a central section 434c that can be wider than ends 434a, 434b. Grooves 430a, 430b are sized to accommodate central section 434c of the pin. Opposing upper edges of the grooves (see edges 510, 512 in FIG. 5) wrap partially around the circumference of section 434c such that pin 432 cannot be placed within the grooves from the top and instead must be slid within the grooves from a lateral direction as indicated by arrow 425. Clips 436a, 436b can be attached to supports 406a, 406b, respectively, after pin 432 is positioned within the grooves. Each clip includes an aperature 438 passing through it that is sized to receive one of the narrower end portions 434a, 434b of pin 432. The apertures are smaller than central portion 434c and thus secure pin 432 within grooves 430a, 430b in lateral direction 425 while grooves 430a, 430b secure the pin in the up/down and the forward/back directions.

A stem 460 is attached at a first end 462 to central portion 434c of pin 432 enabling the stem to rotate with pin 432 at a location within the internal cavity of the wireless charger base (e.g., base 302) around an axis 325. In some embodiments, the stem includes one or more locking teeth that can extend into or through corresponding bores formed in pin 432. To further strengthen the connection between the stem and the pin, the stem can also be welded to pin 432 at multiple weld locations on opposing sides of the pin. As one example, stem 460 can be welded to central section 434c in four locations as shown in FIG. 4C by arrows 442. Bridge 426 spans a channel 428 (see FIG. 4B) in which stem 460 passes through while pivoting on pin 432. A second end of stem 460 is attached to a bottom surface 444 of housing 342 at weld locations 446 which may include welds of a variety of shapes and sizes designed to increase the weld strength. In this manner, hinge 440 enables charging assembly 340 to be moved between the up and down positions described with respect to FIGS. 3A and 3B.

In some embodiments, hinge 400 is designed to provide a smooth and constant force movement of charging assembly 340 between the up and down positions. That is, hinge 400 can provide a substantially constant force profile against torque applied to charging assembly 340 as the charging assembly is moved from the down position to the up position or from the up position to the down position.

As shown in FIGS. 4A-4C, in some embodiments of hinge 400, end section 434a of pin 432 extends beyond clip 436a over friction beam 420a. Similarly, end section 434b can extend beyond clip 436b over friction beam 420b. A tensioner 425 can be disposed between the shelf 408 of each footing 404a, 404b and its respective friction beam 420a, 420b. Each tensioner 425 can exert a force between its respective footing and friction beam that in turn results in the friction beam 420a, 420b contacting the end 434a, 434b of pin 432. Each tensioner can be adjusted to control the amount of force exerted on the pin, which in turn, counteracts torque imparted on hinge 400 as the charging assembly is moved between the up and down positions. Increasing the force that each tensioner 425 exerts on its respective friction beam 420a, 420b results in increased friction between friction beams 420a, 420b and pin ends 434a, 434b, respectively. The increased force translates to an increase in resistance to torque applied to the charging assembly.

In some embodiments, each of the footings 404a, 404b includes a threaded through hole 418 and each tensioners 425 can be a set screw that is threadably coupled to its respective through hole 418. In this manner, each tensioner can be screwed towards its overlying friction beam to increase the friction between the beam and pin 432 or screwed away from the friction beam to decrease friction the beam and pin. If tensioners 425 are adjusted to provide sufficient friction, charging assembly 320 can be placed at almost any intermediate angle between the up and down positions for a charging operation.

Figure 5:
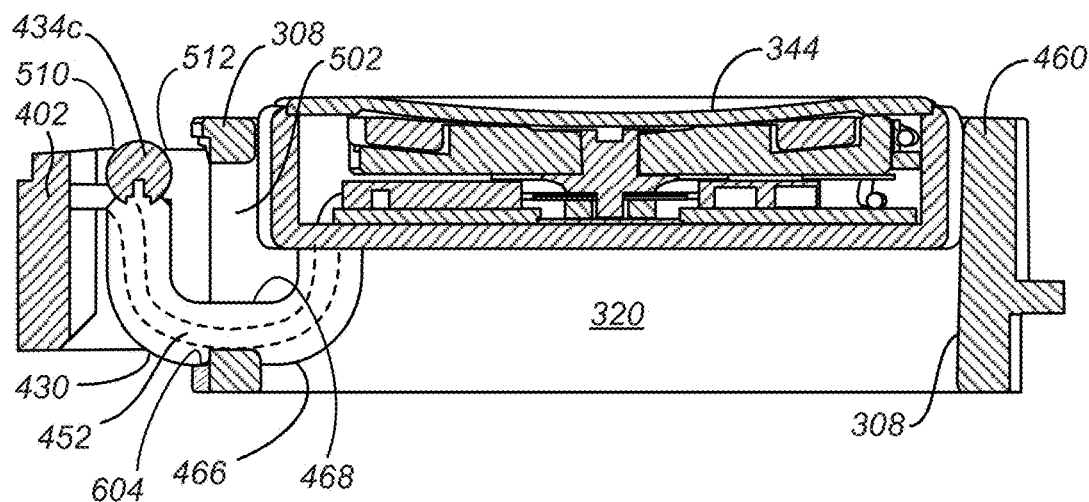
FIG. 5 is a simplified cross-sectional view of the hinge shown in FIG. 4A.
Figure 6:
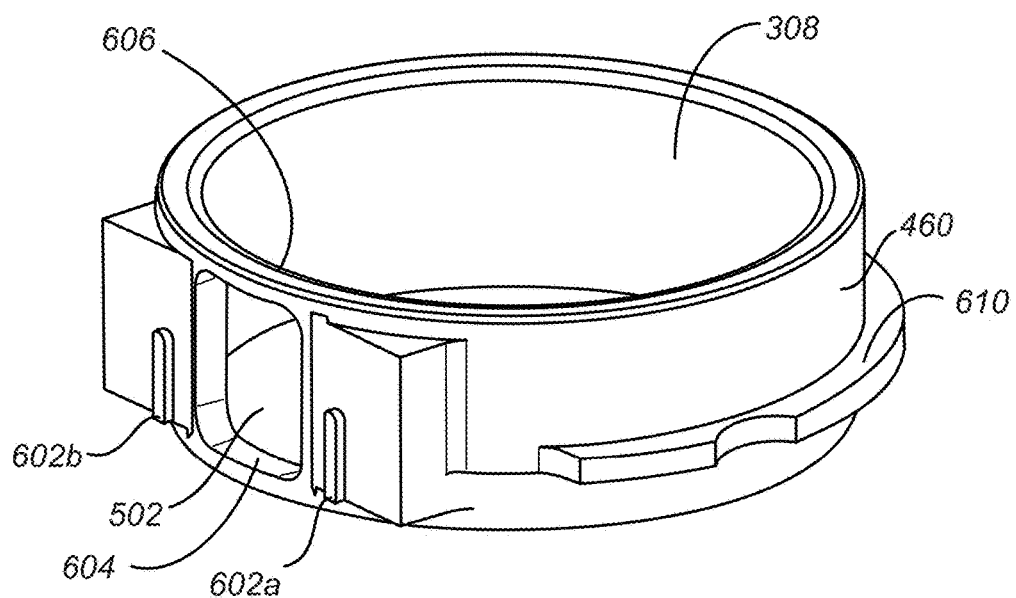
FIG. 6 is a perspective view of one embodiment of a ring to which a hinge according to embodiments of the disclosure can be attached.

As shown in FIGS. 4A-4C, stem 460 is a u-shaped piece that extends from pin 432 underneath and around a portion of ring 460. Referring to FIG. 5, which is a simplified cross-sectional view of a portion of FIG. 4A, and FIG. 6, which is a simplified perspective view of the ring 460, the ring includes an aperture 502 that allows stem 460 to pass through the aperture into opening 320.

Power can be provided through stem 460 to the wireless power transmitter components within housing 342 via a wire (e.g., wire 712 shown in FIG. 7). In order to hide the wire so it is not visible when viewing wireless charger 300, stem 460 includes a passageway 452 (see FIG. 4C) for the wire (see FIG. 4B) in the u-shaped stem and covered by a stem cap 456. As shown in FIG. 5, passageway 452 extends within the stem from a first end 462 near the connection point with pin 432, through the u-shaped section and to a second end 464 that attaches to housing 342 (see FIG. 4B). An opening 448 in the bottom 444 of housing 342 allows the wire to pass from stem 460 into housing 342 while remaining hidden from sight (see FIG. 4A).

Stem 460 can rotate between first and second positions that correspond to the down and up positions, respectively, of charging assembly 340 previously mentioned. In the first position, stem 460 has a first stop in which a first outer surface 466 of stem 460 rests on an inner ledge 604 at the bottom of aperture 502. In the second position, a second outer surface 468, opposite surface 466, comes into contact with an interior surface of a portion 606 of ring 460 that extends above aperture 502. As previously discussed, in various embodiments the stem and inner surface of portion 606 cooperate to ensure that the second stop results in charing assembly 340 positioned in a near vertical alignment in which the charging assembly is positioned at an angle with respect to the base of between 80 and 89 degrees, between 85 and 89 degrees or between 87 and 88 degrees.

The above-described components of hinge 400 can be made out of a variety of different suitable materials. In some embodiments pin block 402, pin 432, stem 460 and stem cap 456 are made from stainless steel or a similarly hard metal. Friction beams 420a, 420b and clips 436a, 436b can also be made from a hard metal, such as stainless steel.

In some embodiments it is beneficial to align charging assembly 340 so that it is parallel with body 302 and positioned at a desired height with respect to upper surface 304. For example, in some embodiments it desirable for the charging assembly to not be raised above surface 304 and instead be recessed from surface 304 by a nominal amount (e.g. less than a couple of millimeters). The charging assembly is attached to the body by hinge 400. Any slight misalignment of charging assembly 340 and body 302 or unintended height discrepancy may detract from the charging capabilities of wireless charger 300 and/or the aesthetic appearance of the wireless charger.

Ring 460 includes a ledge 610 (see FIG. 6) that extends from an outer surface of the ring and aligns with a feature interior to the wireless charger to help secure ring 460 to the base of the wireless charger. To facilitate proper alignment and height adjustment of wireless charging assembly 340 within ring 460, in some embodiments pin block 402 includes first and second female slots 450a, 450b (see FIGS. 4B, 4C) that align with first and second male protrusions 602a, 602b of ring 460 (see FIG. 6). When pin block 402 is attached to ring 460, each protrusion 602a, 602b fits within its respective slot 450a, 450b. The pin block, which is attached to charging assembly 340, can be moved up and down in the vertical direction with respect to ring 460 and thus with respect to the base 302 of the wireless charger. Thus, once ring 460 is attached to base 302, the charging assembly can be spaced at the desired height and properly aligned within opening 320 by moving pin block 402 up and down with respect to ring 460 before attaching the pin block to the ring by, for example, a laser welding operation.

Figure 7A:
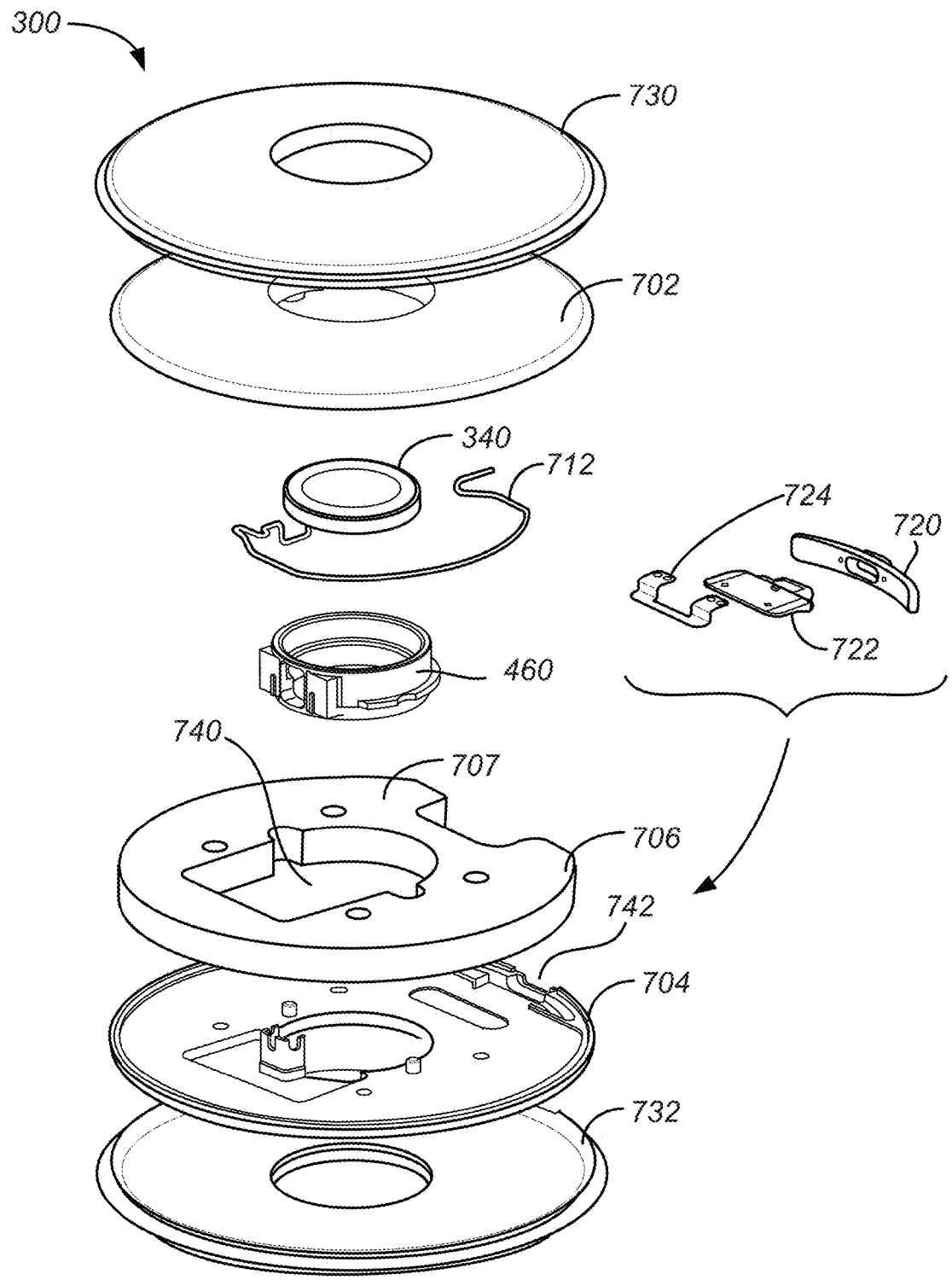
FIGS. 7A and 7B are a simplified exploded views of select components of a wireless charger according to some embodiments of the disclosure.
Figure 7B:
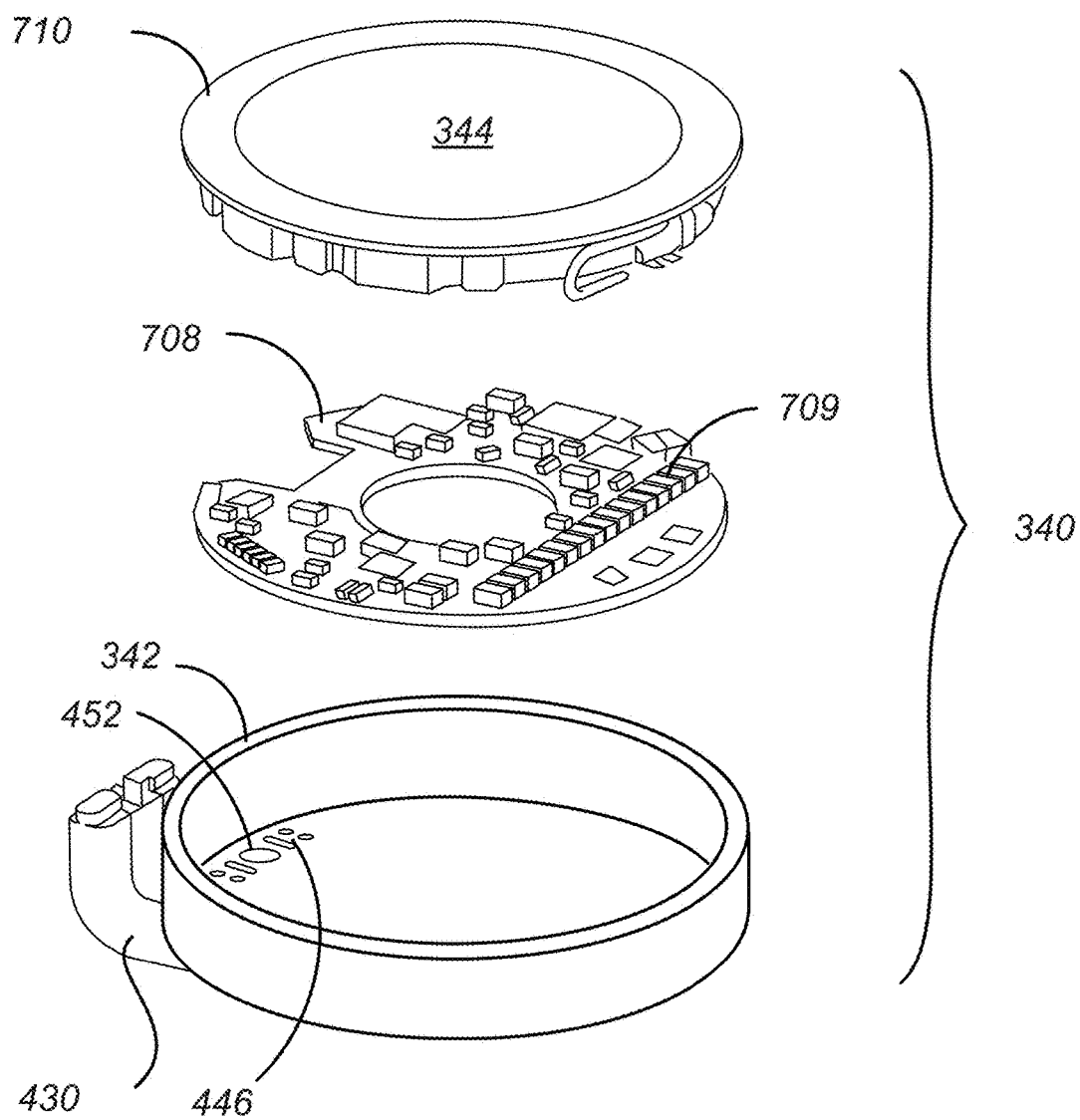

FIGS. 7A and 7B are exploded views of some of the various components that can be assembled together to create wireless charger 300. As shown in FIG. 7A, the base 302 of charger 300 can be assembled from top and bottom shells 702 and 704. In some embodiments, top and bottom shells 702, 704 can be made from a thermoplastic material, such as a polycarbonate resin, or another nonconductive material. A stain resistant cover 732, such as a polyurethane wrap or a thermoplastic silicon rubber can be applied over the top shell, while a non-marking material 730, such as a soft rubber or microfiber wrap, can be applied over bottom shell 704 to prevent wireless charger from scratching or otherwise damaging furniture or other surfaces the device may be placed upon and to reduce movement of the charger on the surface it is placed upon.

A ballast shield 706 can be positioned between top and bottom shells 702 and 704 to provide a desired weight and heft to charger 300. Shield 706 can also be grounded and act as an electromagnetic shield reducing noise that may be generated by the wire that delivers power to the charging assembly coupling to the inductive field of the power transmitting coil. For example, as discussed below a wire 712 can be routed adjacent to the surface of ballast shield 706 to reduce undesirable noise from the wire. Wire 712 can further be wrapped in an absorber material to further reduce noise.

Ballast shield 706 includes a cutout 740 that is sized and shaped to allow the ballast shield to extend around hinge 400 and ring 460. Ballast shield 706 can be made from a metal, such as stainless steel, or another appropriately heavy and electrically conductive metal. Ring 460 can be attached to the ballast shield by aligning a ledge 610 of the ring (see FIG. 6) with a surface 707 of ballast shield 706 surrounding an opening 740. Ring 460 can be made from a metal, such as stainless steel, or any other suitable material. A receptacle connector 722 can be attached to the base bottom shell 704 and positioned between the top and bottom shells so that the opening of the receptacle connector that receives a corresponding plug connector is aligned with opening 742 in the base.

Wireless charging assembly 340 can be positioned within ring 460 and properly aligned with the base of the wireless charger as discussed above. Wire 712 electrically connects the circuitry within wireless charging assembly 340, including the power transmitting circuitry, to connector 722. Wire 712 can actually include multiple, separate insulated wires surrounded by a protective casing or absorber material. For example, in some embodiments, wire 712 includes ground and power wires and in some other embodiments, wire 712 includes separate ground and power wires along with at least two other wires that can be used for data or other signals, such as signals that enable the charger to control power generation. While not shown in the figures, a routing channel can be formed in the interior surface of top shell 702 to secure a portion of wire 712 that extends between connector 722 and the wireless charging assembly.

A connector trim piece 720 can be attached to an outer portion of bottom shell 704, and positioned so that an opening of trim piece 720 is aligned with the opening of the receptacle connector. Trim piece 720 can be made from a conductive metal and can be electrically connected to ground to help, during a mating event, dissipate static electricity that may have built up at the plug connector. A conductive wing 724, which can be made from stainless steel or another conductive material, provides a ground path from trim piece 720 and receptacle connector 722 to ballast shield 706.

Referring now to FIG. 7B, wireless charging assembly 340 can include a shallow cup-shaped housing 342 in which a printed circuit board 708 and multiple electronic components 709 are housed. A cap 710 can be press fit to housing 342 covering printed circuit board 708 and electronic components 709. Charging surface 344 is centrally positioned at an exterior surface of cap 710 and, in some embodiments, charging surface 344 can have concave shape that facilitates self-alignment of the portable electronic device to be charged.

The power transmitting components, some of which are included in electronic components 709 and some of which are not shown in FIG. 7B (e.g., the coil), are positioned within housing 342 adjacent to charging surface 344. Additionally, one or more alignment magnets (not shown) can also be positioned within housing 342 near charging surface 344 to further facilitate self-alignment of the portable electronic device to be charged.

Wireless charging assembly 340 is attached to hinge 340 by stem 430. The stem can be welded to housing 340 at welding locations 446, and as shown in FIGS. 4B and 4C, the stem can also include one or more teeth 454 that can be inserted into corresponding bores in housing 340 to strengthen the connection between the stem and housing. When connected to the housing 342, passageway 452 in stem 430 opens directly to a bottom interior surface of the housing which enables wire 712 to be routed through step 430 into housing 342 while remaining completely within the stem and housing.

Figure 8:
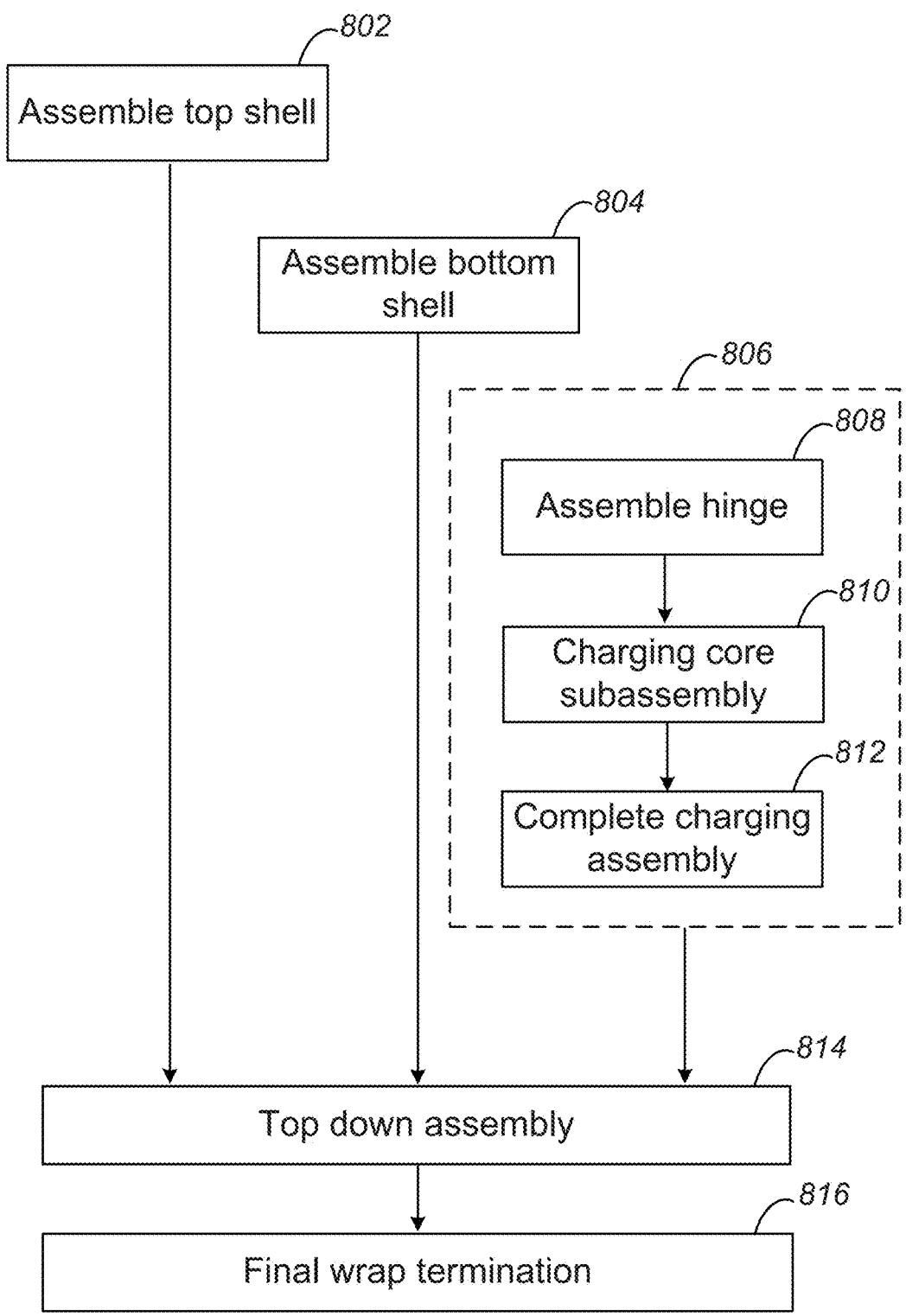
FIG. 8 is a flowchart depicting steps associated with the manufacture of a wireless charger according to some embodiments of the disclosure.

Reference is now made to FIGS. 8 and 9A-9f where FIG. 8 is a flowchart depicting a method 800 of manufacturing a wireless charger according to some embodiments of the disclosure and FIGS. 9A-9F depict a wireless charger in various states of manufacture in accordance with the steps of FIG. 8. The method discussed with respect to FIG. 8 is illustrative only and persons of skill in the art will recognize that the order of the steps discussed with respect to FIG. 8 can vary in some embodiments and that other methods can be used to manufacture a wireless charger according to embodiments of the present disclosure.

As shown in FIG. 8, method 800 includes three blocks: assembling a top shell assembly 902 (block 802), assembling a bottom shell assembly 904 shell (block 804) and assembling the wireless charging assembly 340 (block 806) that can be done independent of each other in parallel. In block 802, top shell assembly 902 can be formed by adhering top shell 702 to an outer polyurethane wrap 730 by an adhesive, such as a pressure sensitive adhesive (PSA). In some embodiments, a layer of foam 914 is placed between top shell 702 and polyurethane wrap 730. Foam layer 904 can be adhered to top shell 702 by PSA or other adhesive 912 and polyurethane wrap 730 can be adhered to foam layer 914 by an adhesive 916, such as a PSA.

Figure 9A:
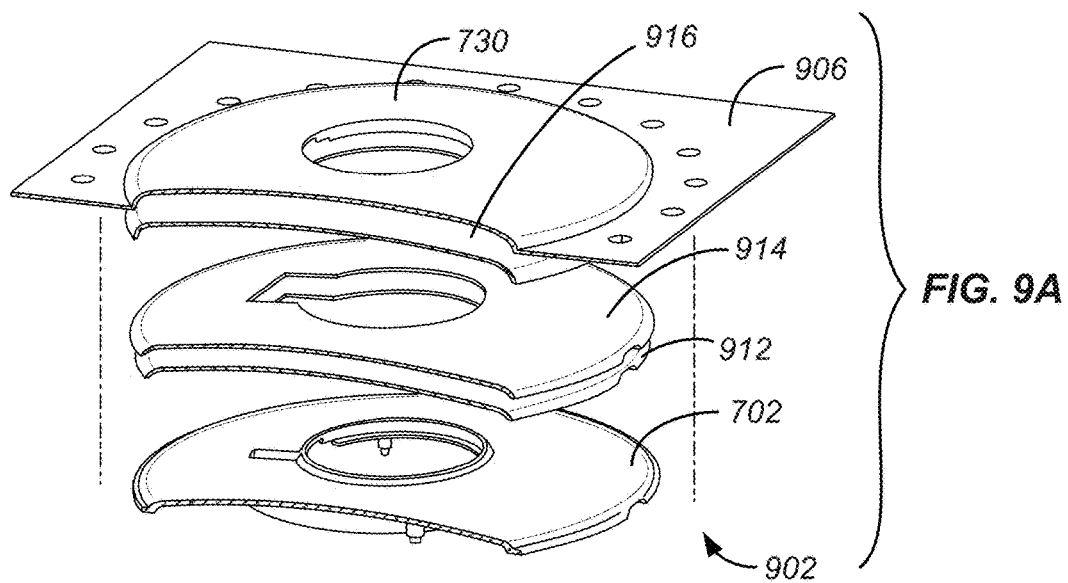
FIGS. 9A-9F illustrate the manufacture of a wireless charger in accordance with the method depicted in FIG. 8 according to some embodiments of the disclosure.
Figure 9B:
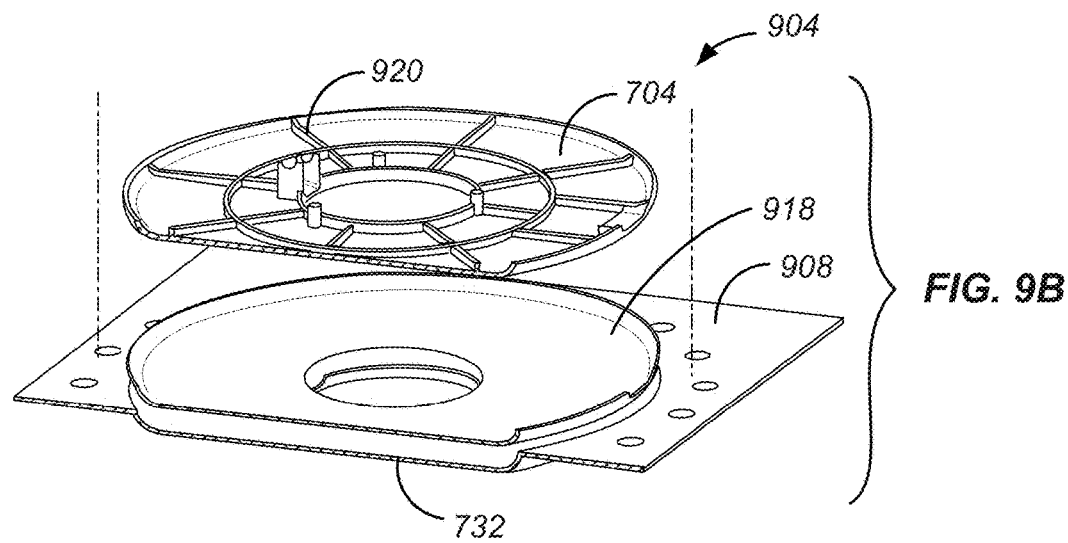
Figure 9C:
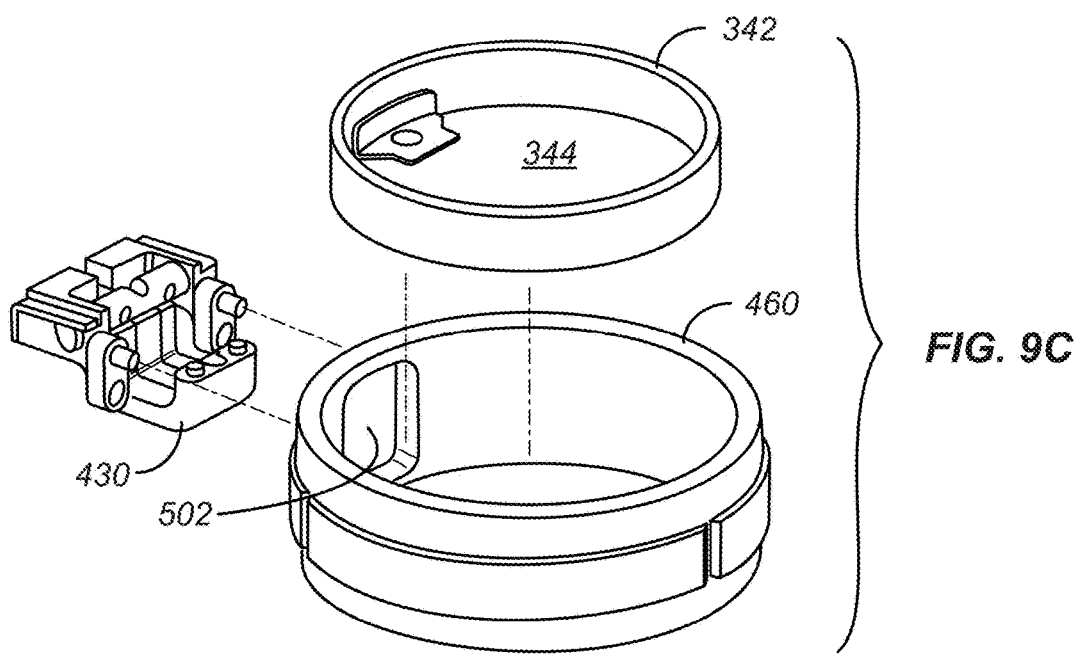

In block 804, bottom shell assembly 904 can be formed by adhering bottom shell 704 to an outer microfiber layer 732 by an adhesive 908. As shown in FIG. 9B, in some embodiments either or both of shells 702 and 704 may include internal ridges 920 to strengthen and provide more rigidity to the shells. Additionally, outer layers 730 and 732 can include skirts 912, 914, each of which extends beyond what will be the outer perimeter of charger 300 by a desired length, such as 1 inch or so. The two skirts are later adhered together and trimmed (block 816) to the edge of rim 310.

Wireless charging assembly can be assembled (block 806) by first assembling hinge 400 (block 808). To assemble hinge 400, wire 712 can be routed through channel 452 of stem 430 and cap 456 can be secured to the stem to cover the wire so that one end of the wire extends through the u-section portion of stem 430 and out of channel 450 near first end 462 and at second end 464. Stem 430 can then be attached to pin 432, by for example, inserting interlocking teeth 454 into corresponding bores in center section 434c of pin 432 and laser welded the stem to the pin.

With stem 430 attached to it, pin 432 can be threaded into grooves 430a, 430b on pin block 402 and clips 436a, 436b can be laser welded or otherwise attached to the pin block to secure pin 432 within the groove. Friction beams 420a, 420b can then be attached to footings 404a, 404b by fasteners 422, 424 and tensioners 425 can be set and adjusted to exert a desired force on the friction beams to, in turn, impart a desired level of friction to pin 432 as the pin rotates within groove 430a, 430b.

Once the hinge is assembled (block 808), it can be connected to housing 342 via stem 430. The stem can be inserted through aperture 502 of ring 460 and housing 340 can be positioned within the opening defined by the ring. Next, stem 430 can be attached to housing 342 while it is positioned within the ring as described above (block 810) and as illustrated in FIG. 9C. Protrusions 62a, 602b on ring 460 can be inserted within slots 450a, 450b, respectively, and the ring can moved up and down with respect to the hinge to align charging assembly 340 within ring 460 as discussed above so that it will be parallel to base 302 once the ring is attached to the base. Once aligned, hinge 400 can be attached to ring 460 with using laser welding or other suitable techniques.

Figure 9D:
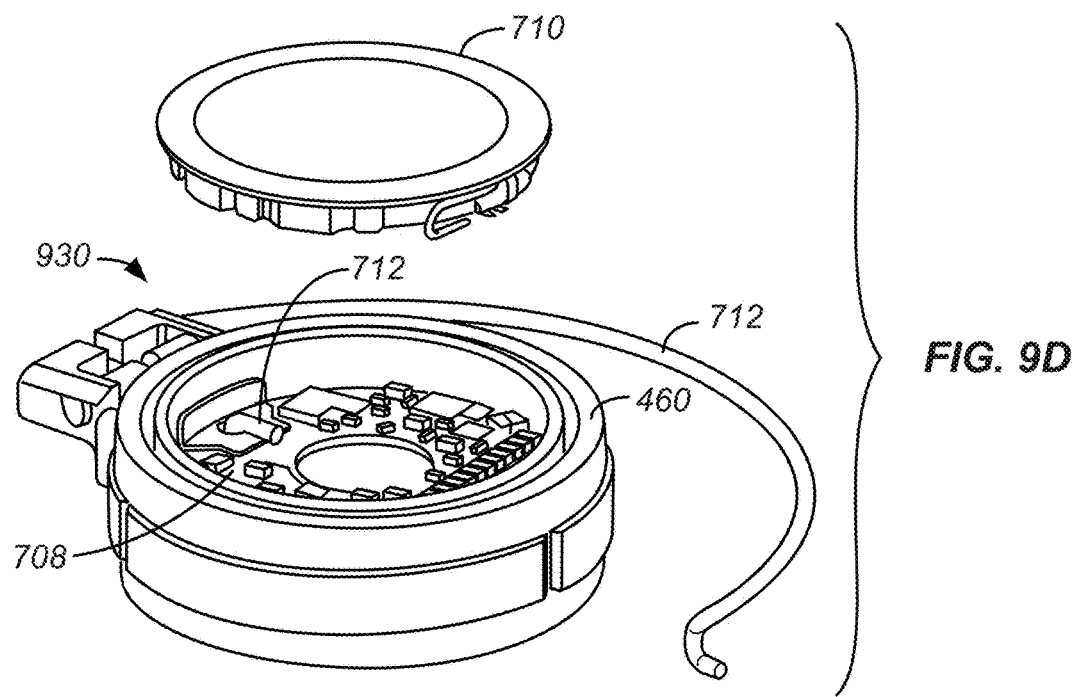

In block 812, the hinge/wireless charging module 930 can be completed by attaching printed circuit board 708 having electronic components 709 coupled thereto, to housing 432, assembling the remaining portions of the power transmitting unit, including the coil, within the housing, and attaching cap 710 to housing 342 (FIG. 9D).

Figure 9E:
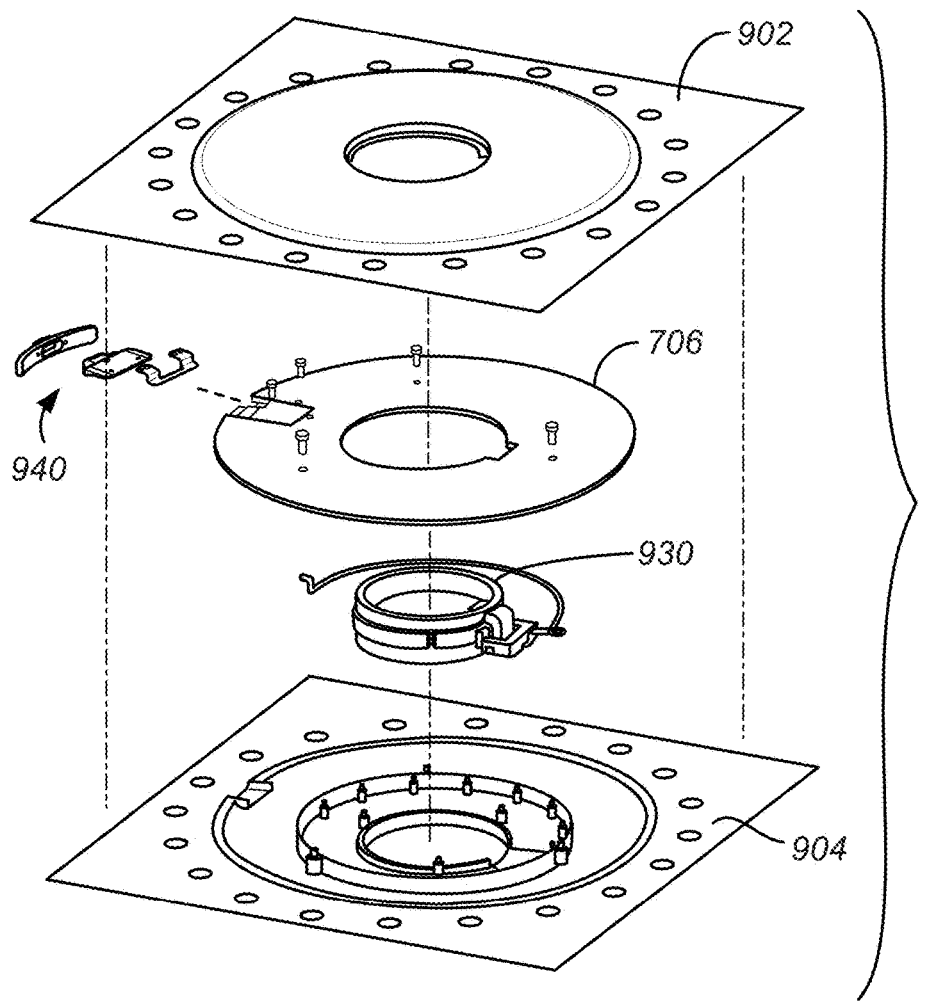
Figure 9F:
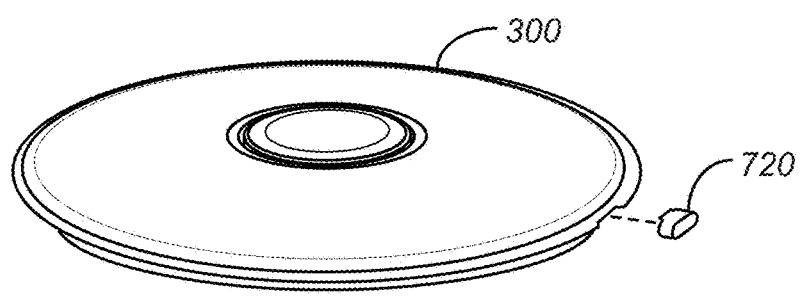

Referring to FIG. 9E and block 814, top shell assembly 902, which can have a milled or similar cut-out portion sized and shaped to accept hinge/wireless charging module 930, can placed upside down and module 930 can be positioned within the cutout section. Top shell assembly 902 can also have a channel for wire 712 formed in its interior upper surface and the wire can be routed through the channel.

The receptacle connector assembly 940 (connector 720, trim ring 722 and ground wing 724) can also be placed in an appropriate position within top shell assembly 902 and ballast 706 can then be adhered to the top shell assembly 902 with a PSA or other adhesive layer (not shown) while electrically connecting ground wing 724 to ballast shield 706. Bottom shell assembly 904 can then be attached by adhering assembly 904 to the ballast shield with a PSA or other adhesive layer (not shown) and adhering the rim of assembly 902 to the rim of assembly 904 and the skirt of layer 732 to the skirt of layer 730. The excess skirts can be trimmed to the edge of the rim to complete the formation of a wireless charger according to some embodiments of the disclosure (block 816).

Figure 10A:
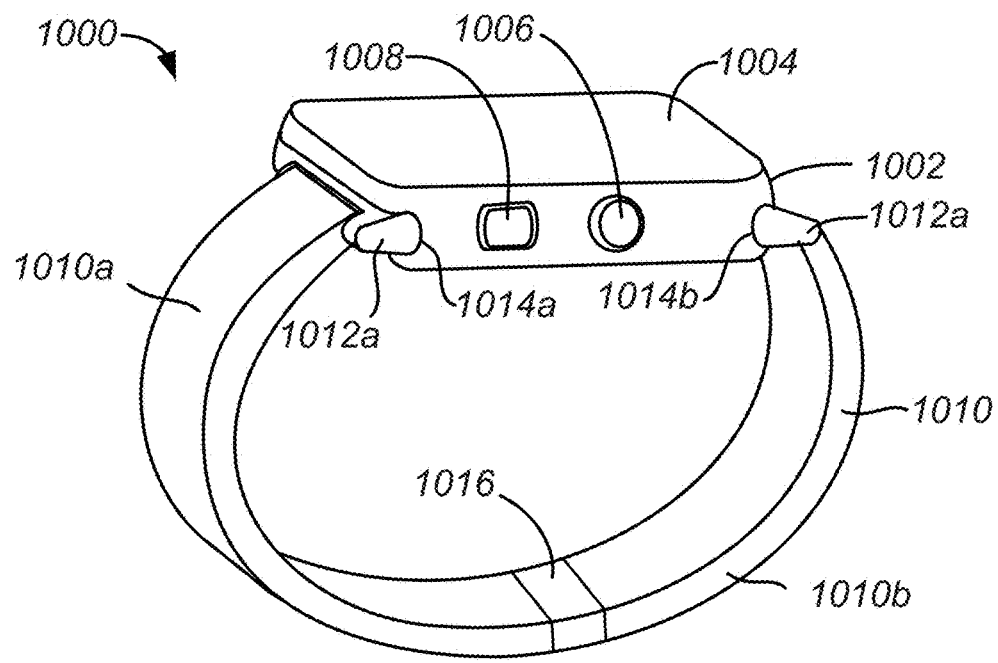
FIG. 10A is a simplified front perspective view of one type of portable electronic device with which embodiments of the disclosure may be used.
Figure 10B:
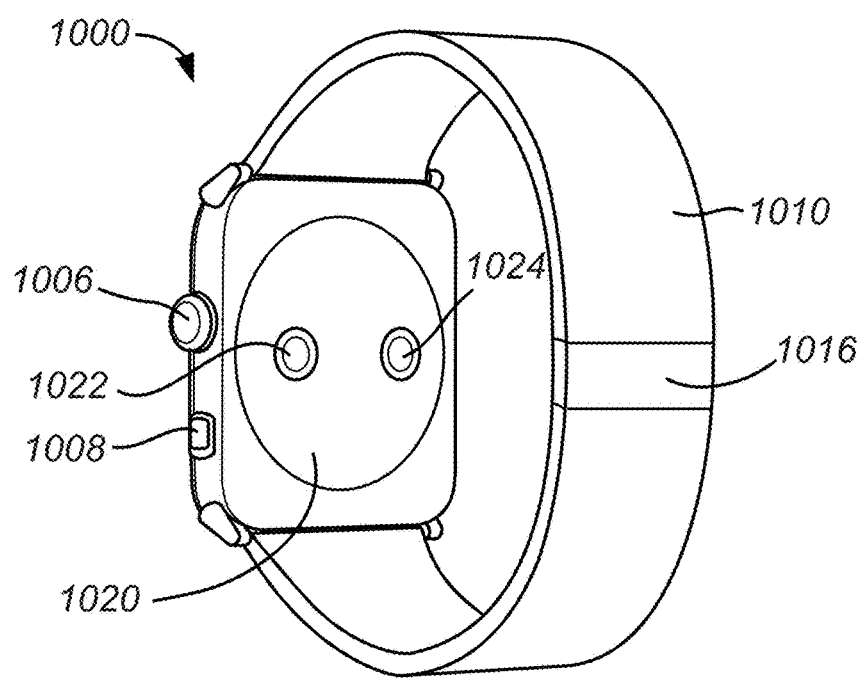
FIG. 10B is a simplified rear perspective view of the portable electronic device shown in FIG. 10A.

Reference is now made to FIGS. 10A and 10B, which depict front and rear perspective views of one type of portable electronic device with which embodiments of the disclosure may be used. As shown, wearable electronic device 1000 includes a casing 1002 that houses a display 1004 and various input devices including a dial 1006 and a button 1008.

Device 1000 may be worn on a user's wrist and secured thereto by a band 1010. Band 1010 includes lugs 1012 at opposing ends of the band that fit within respective recesses or aperatures 1014 of the casing and allow band 1010 to be removeably attached to casing 1002. Lugs 1012 may be part of band 1010 or may be separable (and/or separate) from the band. Generally, the lugs may lock into recesses 1014 and thereby maintain connection between the band and casing 1002. The user may release a locking mechanism (not shown) to permit the lugs to slide or otherwise move out of the recesses. In some wearable devices, the recesses may be formed in the band and the lugs may be affixed or incorporated into the casing.

Casing 1002 also houses electronic circuitry (not shown in FIG. 10A or 10B), including a processor and communication circuitry, along with sensors 1022, 1024 that are exposed on a bottom surface 1020 of casing 1002. The circuitry, sensors, display and input devices enable wearable electronic device 1000 to perform a variety of functions including, but not limited to: keeping time; monitoring a user's physiological signals and providing health-related information based on those signals; communicating (in a wired or wireless fashion) with other electronic devices; providing alerts to a user, which may include audio, haptic, visual and/or other sensory output, any or all of which may be synchronized with one another; visually depicting data on a display; gathering data form one or more sensors that may be used to initiate, control, or modify operations of the device; determining a location of a touch on a surface of the device and/or an amount of force exerted on the device, and use either or both as input; accepting voice input to control one or more functions; accepting tactile input to control one or more functions; and so on.

A battery (not shown in FIG. 10A or 10B) internal to casing 1002 powers wearable electronic device 1000. The battery can be inductively charged by an external power source, such as wireless charger 300, and wearable electronic device 1000 can include circuitry configured to operate as a receiver in a wireless power transfer system as described with respect to FIG. 2. Bottom surface 1020 can have a convex shape that enables the surface to facilitate proper alignment to a wireless power transmitter in the wireless charger. Also, while not shown in FIG. 10A or 10B, portable electronic device 1000 may include one or more magnets or magnetic plates, such as alignment magnet 218, that can further assist in aligning device 1000 to the charging surface of a wireless charger.

Figure 11A:
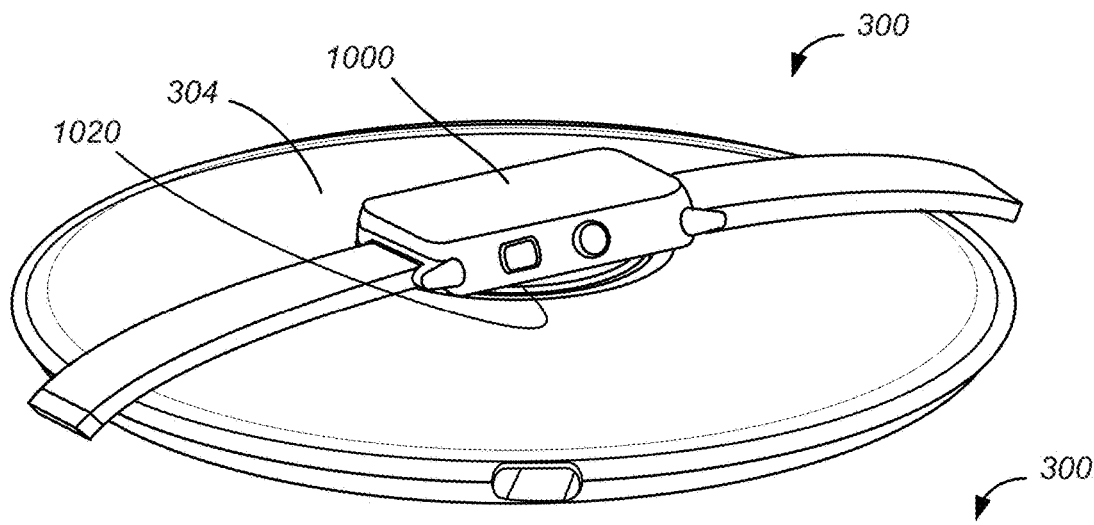
FIG. 11A is a perspective view of the wireless charger shown in FIGS. 3A-3D with the portable electronic device shown in FIGS. 10A and 10B place on the charger in a first charging position.

FIG. 11A is a perspective view of wireless charger 300 shown in FIGS. 3A-3D with wrist-worn portable electronic device 1000 shown in FIGS. 10A and 10B place on the charger in a first charging position. As shown in FIG. 11A, wrist-worn portable electronic device 1000 lies essentially flat across upper surface 304 of charger 300 in the first position. Bottom surface 1020 of device 1000 can align with concave charging surface 345 (not visible in FIG. 11A) of wireless charging assembly 340 to facilitate proper alignment of the wireless power receiving components within device 1000 with the wireless power transmitting components within charging assembly 340. Additionally, one or more alignment magnets (not shown) can also facilitate proper alignment between the wireless power receiving and transmitting components.

Figure 11B:
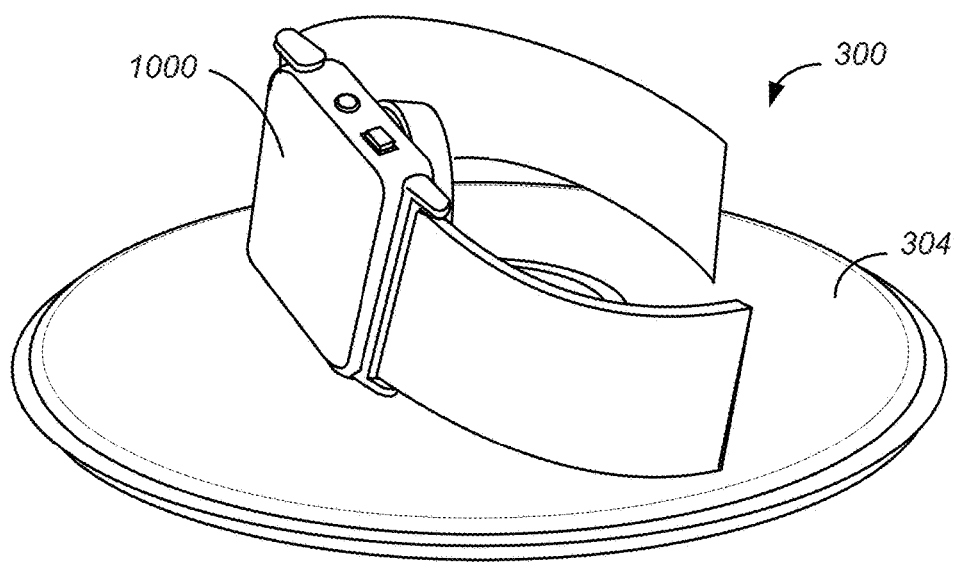
FIG. 11B is a perspective view of the wireless charger shown in FIGS. 3A-3D with the portable electronic device shown in FIGS. 10A and 10B place on the charger in a second charging position different than the first charging position.

FIG. 11B is a perspective view of wireless charger 300 with portable electronic device 1000 placed on the charger in a second charging position different than the first charging position. As shown in FIG. 11B, wrist-worn portable electronic device 1000 is placed on its side adjacent to upper surface 304 of charger 300 in the second position in which device 1000 leans against wireless charging assembly at a near vertical angle. Bottom surface 1020 of device 1000 can be aligned with concave charging surface 345 (not visible in FIG. 11B) of wireless charging assembly 340 to facilitate proper alignment of the wireless power receiving components within device 1000 with the wireless power transmitting components within charging assembly 340. A combination of magnets and gravity can help secure wrist-worn portable electronic device 1000 to the wireless charging assembly. The magnets (not shown) can also facilitate proper alignment between the wireless power receiving and transmitting components in this second position.

Wireless chargers according to some embodiments of the disclosure can be used to charge several different portable electronic devices that may vary in size. For example, wrist-work electronic device 1000 may be available in two or more sizes where the casings of the different size devices differ in width and length. Some embodiments of wireless chargers according to the disclosure have an alignment magnet that generates a magnetic field that attracts a portable electronic device to a center of the charging surface. FIG. 12A is a simplified top representation of a wireless charging assembly 1200 according to some such embodiments of the disclosure. In FIG. 12A, wireless charging assembly 1200 is centered within an opening 1205 (e.g., the opening defined by an interior surface of ring 460) of a wireless charger and attached to a hinge 1220 within a base of the wireless charger by a stem 1222. Merely as examples, wireless charging assembly can be charging assembly 340, opening 1205 can be opening 320, hinge 1220 can be hinge 400 and stem 1222 can be stem 430.

Wireless charging assembly 1200 includes a concave charging surface 1210 surrounded by an annular surface 1212. A power transmitting coil 1214 is positioned under charging surface 1210 and an alignment magnet 1216 is centered within the charging surface and concentric with coil 1214 as indicated by center point 1218. When a portable electronic device is positioned against charging surface 1210, alignment magnet 1216, which can be in a fixed position within assembly 1200, can help center the device to power transmitting coil 1214 thus increasing the efficiency of any charging operation.

When the charging assembly is in the up position, however, it may be desirable for a side surface of the portable electronic device to rest upon an upper surface of the charging station (e.g., upon upper surface 304 in wireless charger 300). Towards this end, and if wireless charging station 1200 is part of an ecosystem that includes multiple sized portable electronic devices, a larger sized portable electronic device may rest against an upper surface of the charging station in the up position. A smaller portable electronic device magnetically attached to wireless charging assembly 1200, however, may have its edge raised slightly above the surface of the charging station as shown in FIG. 13A, which is a side view of a portable electronic device 1300 positioned against wireless charging assembly 1200 in a charging position. As shown in FIG. 13A, a side surface 1302 of device 1300 is not in physical contact with an upper surface 1226 of a base 1228 of the wireless charger. Such an arrangement may result in portable electronic device 1300 being less stable in the charging position than desired.

Some embodiments of the disclosure invention include an alignment magnet that is slightly off-center to prevent such a situation. For example, as shown in FIG. 12B, which illustrates a wireless charging assembly 1250 that can be identical to assembly wireless charging assembly 1200 except that it includes an alignment magnet 1230 that is in a fixed position slightly off-center from center point 1218 towards hinge 1220 instead of centered magnet 1216.

Referring to FIG. 13B, which is a side view of a portable electronic device 1300 positioned against wireless charging assembly 1250 in a charging position. As indicated by arrow 1310 in FIG. 13B, the position of magnet 1230 (not shown in the figure) centered at point 1232 below center point 1218 generates a magnetic field that biases device 1300 down towards surface 1226. Biasing device 1300 downward in this manner and off center from coil 1214 may slightly reduce charging efficiency but provides a stable arrangement in which side surface 1302 of device 1300 contacts surface 1226. In some embodiments, alignment magnet 1230 is off-center (i.e., the distance between points 1218 and 1232) by less than 3 mm, while in some embodiments magnet 1230 is off-center by less than 2 mm or by between 0.5 and 1.0 mm.

To maximize charging efficiency of a portable electronic device, the wireless power receiver of the device should be aligned with the wireless power transmitter of the charger as discussed above with respect to FIG. 2. Charging differently-sized portable electronics devices on a single wireless charger can present challenges to maximizing the charging efficiency for the differently-sized devices. Some embodiments of the disclosure include a wireless charging assembly in which the power transmitting coil can be moved up and down to more properly align with different sized devices. In some embodiments the power transmitting coil can move within a housing of the wireless assembly and in other embodiments, the entire assembly can move up and down, for example, at the hinge.

Figure 14A:
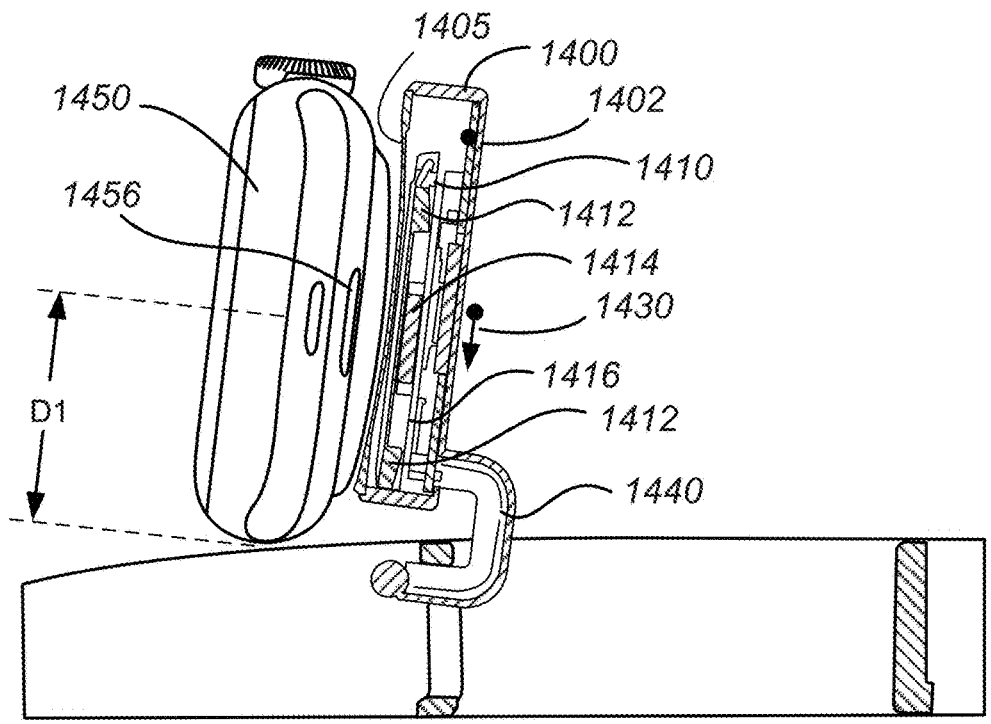
FIGS. 14A and 14B are simplified side cross-sectional views illustrating a moveable wireless power transmitting component within a wireless charging assembly according to some embodiments of the disclosure.
Figure 14B:
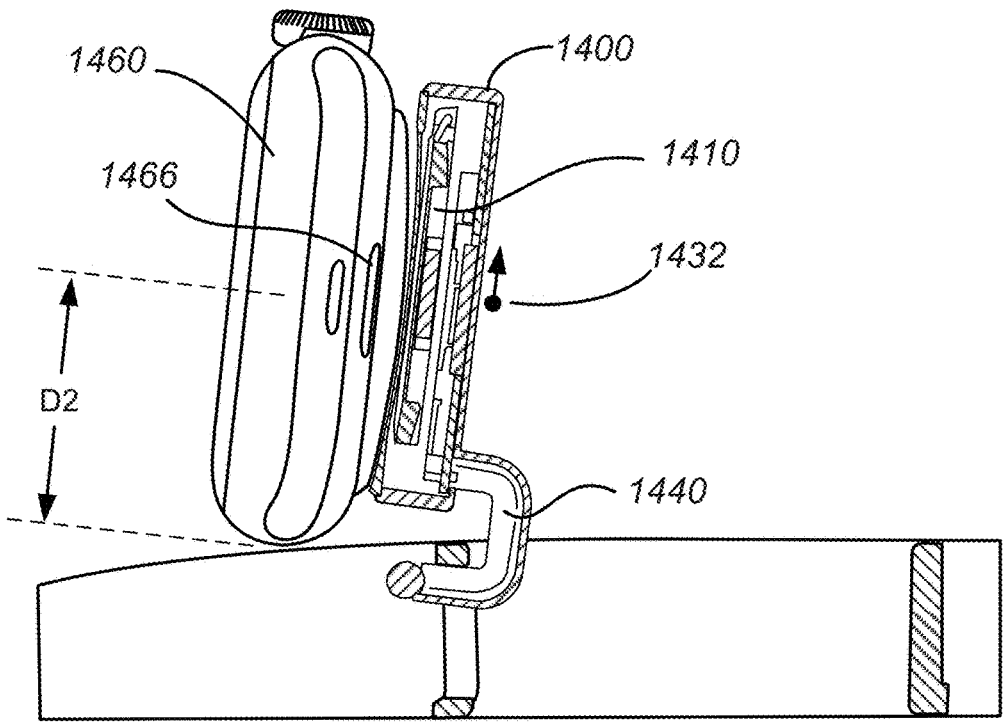

FIGS. 14A and 14B are simplified side cross-sectional views illustrating movement of a wireless power transmitter 1410 within a wireless charging assembly 1400 according to some embodiments of the disclosure. Charging assembly 1400 can be, for example, wireless charging assembly 340. As shown in FIG. 14A, a portable electronic device 1450 is positioned against a charging surface 1405 of wireless charging assembly 1400 in a charging position in which an edge of device 1450 is supported by an upper surface of the charging station that assembly 1400 is part of Wireless power transmitter 1410 is disposed within a housing 1402 and includes a power transmitting coil 1412, an alignment magnet 1414 and a support 1416. Support 1416 is moveable within housing 1402 and coil 1410 and magnet 1412 are both attached to the support so that they move within the housing along with the support. Support 1420 can be any structure that can be moved back and forth within housing 1402 and in some embodiments support 1420 can be a diaphragm or other compliant membrane.

In FIG. 14A, portable electronic device 1450 is smaller than some other portable electronic devices that can be charged by charging assembly 1450. Thus, a distance, D1, between an edge and a center of device 1450 is less than distance, D2, between the same points in, for example, a portable electronic device 1460 shown in FIG. 14B that has the same general look as device 1450 but a larger casing.

When portable electronic device 1450 is placed against charging surface 1405, alignment magnet 1414 is attracted to and aligns with an alignment magnet 1456 in device 1450. Since magnet 1414 is attached to moveable support 1410, the moveable support moves within housing 1402 with the magnet down towards the base of the charger in direction 1430. Since coil 1412 is also attached to support 1410, the coil also moves down to better align to the power receiving coil in portable electronic device 1450 that is centered around magnet 1456.

In FIG. 14B, a larger electronic device 1460 is in a charging position with its side surface supported by an upper surface of the charging station. In the charging position, the back surface of portable electronic device 1460 is adjacent to and in contact with charging surface 1405 and alignment magnet 1414 is attracted to and aligns with an alignment magnet 1466 in device 1450. Because of the larger size of device 1460, magnet 1414 and moveable support 1410 moves within housing 1402 up away from the base of the charger in direction 1430, which results in coil 1412 also moving up to better align to the power receiving coil in portable electronic device 1460 that is centered around magnet 1466.

While the embodiments of a moveable wireless power transmitter discussed with respect to FIGS. 14A and 14B each rely on magnetic forces to passively move the power transmitter to a more efficient charging position, other embodiments of the disclosure may move the power transmitter using other techniques. For example, in some embodiments circuitry within a wireless charger can determine the type of portable electronic device positioned against the charging surface and actively move the power transmitter to an ideal charging position based on known characteristics of the device. As an example, circuitry within wireless charging assembly 1400 or the wireless charger can receive a device ID or other information from the portable electronic device during an authentication or an identification handshaking process that proceeds charging in which information is sent from the portable electronic device in response to a request from the charger. The charger can determine the type and size of the portable electronic device, select an ideal position for the wireless power transmitter and then actively move the power transmitter in the ideal position using an electromagnet or a variety of other different techniques.

Each of FIGS. 14A and 14B show wireless charging assembly 1400 being attached to a base of a wireless charger by a hinge 1440 that can be similar to hinge 400 discussed with respect to FIGS. 4A-4C. Embodiments of the disclosure can be used with many different types of hinges, however, some of which are discussed with respect to FIGS. 15A-15G below. Each of the hinges discussed below with respect to FIGS. 15A-15G can be positioned within the interior of a base of a charging station thus hiding the hinge from view. Each hinge also includes a stem (generally not visible in the figures) that connects the hinge to a wireless charging assembly (also not shown in the figures), such as wireless charging assembly 340. Some of the hinges are bi-stable hinges in which the hinge is strongly biased towards either of two positions that can coincide with the down and up positions described above.

FIGS. 15A-15G are simplified perspective views of hinges according to some embodiments of the disclosure. Each of the hinges shown in FIGS. 15A-15G include a pin block 1500 having a pin 1502 that rotates within a groove 1504. As shown in the figures, groove 1504 includes first and second portions that are aligned with each other to accept pin 1502 with a cutout 1506 formed between the two grooves that allows the stem to at least partially rotate through the cutout. For ease of illustration, reference numbers 1500, 1502 and 1504 are only shown in FIG. 15A. A stem is connected to a central portion of the pin so that when the pin rotates, the stem rotates as well around a pivot point that can be located within the base of a wireless charger and thus hidden from view. Generally, each of the hinge designs enables the stem to be moved between first and second positions, which in turn, enable a wireless charging assembly connected to the stem to be moved between down and up positions as described above with respect to FIGS. 3A and 3B. Individual ones of the hinges shown in FIGS. 15A-15G differ primarily, but not exclusively, in the manner in which movement of the hinge is controlled when moving between the first and second positions.

Figure 15A:
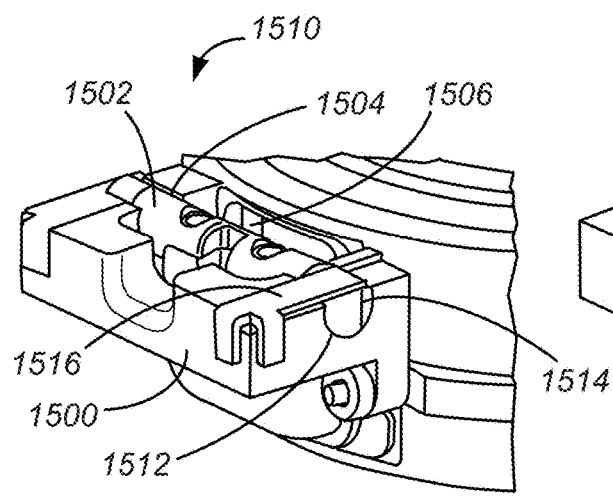
FIGS. 15A-15G are simplified perspective views of hinges according to some embodiments of the disclosure.

FIG. 15A is a simplified perspective view of a bi-stable hinge 1510 with a cam and leaf design. In FIG. 15A, pin 1502 has a cross-section with a circular portion 1512 and a flat portion 1514 enabling the pin to act as a cam. As the pin rotates within groove 1504, a leaf 1516 attached to the pin block over an edge of the cam is pressed against the pin. As circular portion 1512 rotates under leaf 1516, the leaf exerts a force against the pin and hinge 1512 acts as a friction hinge. When flat portion 1514 reaches leaf 1516, friction is greatly reduced creating toggle point at which the hinge snaps to a second position in which the charging assembly is positioned at a nearly vertical angle as described above. In this position, leaf 1516 is pressed against flat portion 1514 resulting in a stable position in which the hinge will remain until a sufficient amount of force is applied to the wireless charging assembly to move the cam back such that circular portion 1512 is in contact with leaf 1516.

Figure 15B:
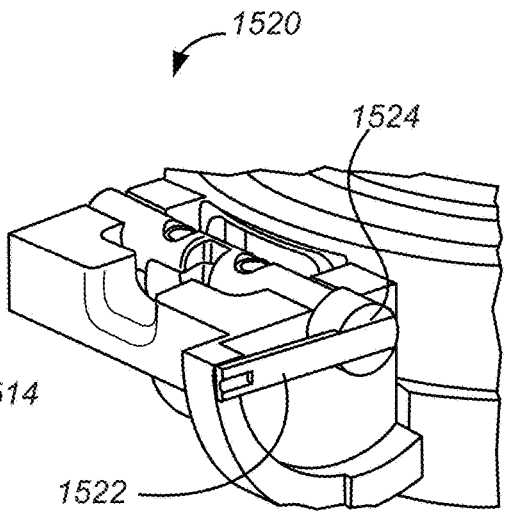

FIG. 15B is a simplified perspective view of another embodiment of a bi-stable hinge 1520. Hinge 1520 includes a detent arm 1522 attached to the pin block that is biased towards and end of pin 1502 that includes a channel 1524 within which detent arm 1522 fits. As the pin rotates within groove 1504, arm 1522 is pressed against the end of pin 1502 acting as a friction hinge. When the pin rotates sufficiently that channel 1522 align with detent arm 1522, the detent arm readily moves into the channel holding charging assembly in a near vertical up position. Similar to hinge 1510, hinge 1520 will remain in the up position until a sufficient amount of force is applied to the wireless charging assembly to rotate the pin back so that detent arm 1522 exits channel 1524. In some embodiments, channel 1522 has sloped edges along its length making it easier for detent arm 1522 to move in and out of the channel.

Figure 15C:
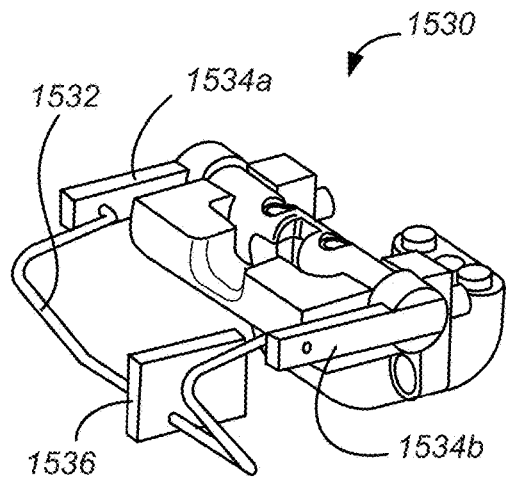

FIG. 15C is a simplified perspective view of still another embodiment of a bi-stable hinge 1530. Hinge 1530 includes a spring 1532 attached between arms 1534a, 1534b and a retaining block 1536. Each of the arms 1534a, 1534b are attached to opposing ends of pin 1502 and rotate with the pin. Spring 1532 pivots within arms 1534a, 1534b and retaining block 1536 relocating force from the hinge out and down and creating a toggle point at which the hinge changes its bias to move the wireless charging assembly from the down position to the up position.

Figure 15D:
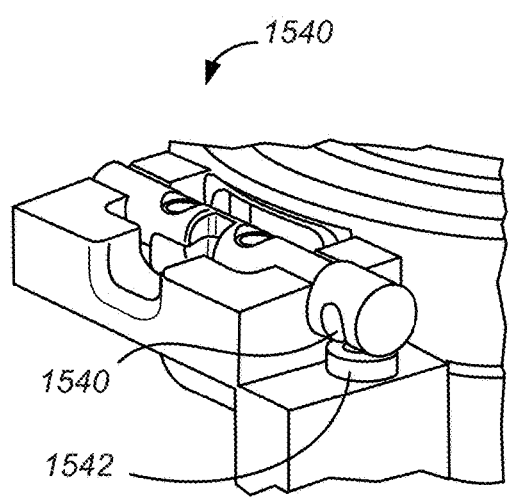

FIG. 15D is a simplified perspective view of an embodiment of a bi-stable hinge 1540 that includes a ball detent 1542. Rotatable pin 1502 includes a channel 1540 that is sized to receive the ball portion of ball detent 1542. The ball detent 1542 is positioned directly under an end of pin 1502 so that the ball slides within channel 1540 as the pin rotates between the down and up positions and imparts friction against the hinge's movement. In some embodiments a depression (not shown) can be formed within channel 1540 at one end or both ends of the channel to creates a bi-stable hinge in which the wireless charging assembly is inclined to stay in either the up or down positions without remaining at an intermediary position.

Figure 15E:
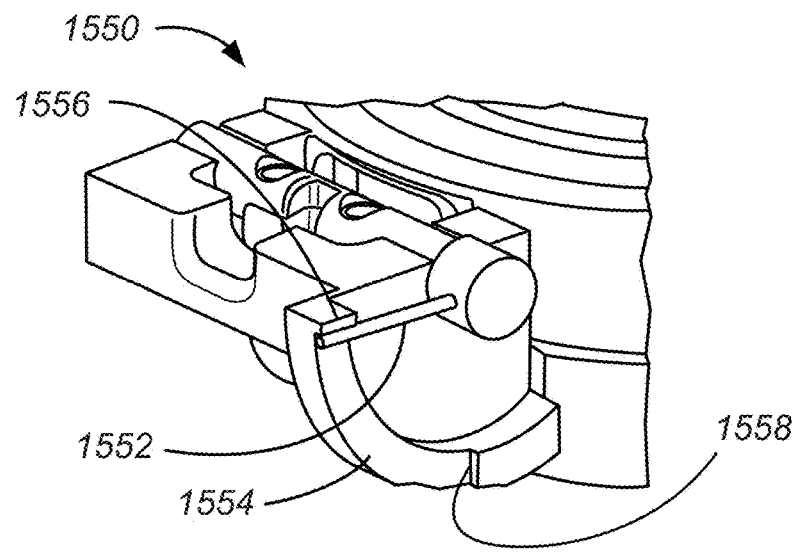

FIG. 15E is a simplified perspective view of a hinge 1550 having a cam arm 1552. Cam arm 1552 is attached to an end of pin 1502 that travels along a channel 1554 formed in pin block 1500. Channel 1554 has first and second stops 1556 and 1558 that define the down and up positions, respectively, of a wireless charging assembly attached to hinge 1550.

Figure 15F:
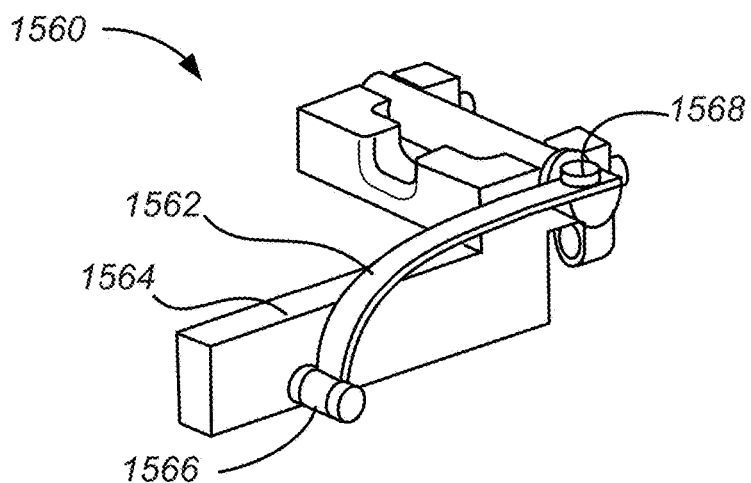

FIG. 15F is a simplified perspective view of a bi-stable hinge 1560 having a buckling beam 1562 connected between an extension 1564 of pin block 1500 and an end of rotatable pin 1502. Buckling beam 1562 is attached to pin block extension 1564 by a rod 1566 and is attached to rotatable pin 1502 by fastener 1568. As connected in hinge 1560, the bucking beam has a strong tendency to move into one of two natural positions: a first position shown in FIG. 15F in which beam 1562 is bent upwards and a second position in which the beam is bent downwards (not shown). In the first position, the wireless charging assembly is in the down position (e.g., FIG. 3A). The buckling beam moves into the second position as pin 1502 rotates counterclockwise moving the wireless charging assembly into the up position (FIG. 3B).

Figure 15G:
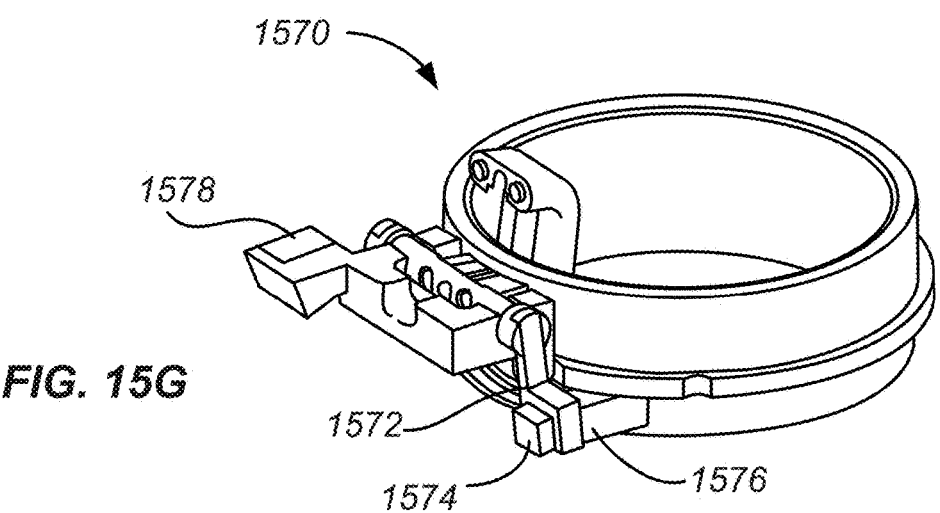

FIG. 15G is a simplified perspective view of another embodiment of a bi-stable hinge 1570 according to the disclosure. Hinge 1570 includes an arm 1572 attached to rotating pin 1502 and a pair of attracting magnets 1574, 1576 and a pair of fighting magnets (only one of which, magnet 1578, is shown). The magnets cooperate to bias the hinge into first and second positions, which in turn, move the wireless charging assembly to down and up positions, respectively.

The foregoing description, for purposes of explanation, used specific nomenclature to provide a thorough understanding of the described embodiments. However, it will be apparent to one skilled in the art that the specific details are not required in order to practice the described embodiments. For example, while several specific embodiments of the invention described above use inductive coupling to wirelessly transmit power to a wearable electronic device, the invention is not limited to any particular wireless power transfer technique and other near-field or non-radiative wireless power transfer techniques as well as radiative wireless power transfer techniques can be used in some embodiments. Also, while wireless charger 300 was described as having a circular base 302 with a central circular opening 320, the shape of the base and the opening can vary in embodiments. For example, in some embodiments base 302 may have an oval, rectangular, square or other shape. Similarly, opening 320 may have a shape that matches that of base 302 or a different shape altogether. Also, while opening 320 is centered in the embodiments of FIGS. 3A-3D, in other embodiments, the opening can be at different locations and/or instead of being an opening that extends entirely through the base, may be a cavity or recess within the base with an opening at an exterior surface of the base for the charging assembly to pivot out of Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed:

1. A wireless charger for an electronic device, the wireless charger comprising:
   a base having a base opening and an interior cavity defined by an upper shell, a lower shell and an inner sidewall extending between the base opening and interior cavity and between the upper and lower shells to define the base opening;
   an aperture formed through the inner sidewall between the interior cavity and the base opening;
   a hinge having a rotational axis within the interior cavity, the hinge extending from the interior cavity through the aperture into the base opening;
   a wireless charging assembly pivotably attached to the base by the hinge and moveable between a down position in which the wireless charging assembly is disposed within the base opening and an up position in which the wireless charging assembly extends outside the base, the charging assembly having a charging surface and a power transmitting unit disposed adjacent to the charging surface, the power transmitting unit configured to wirelessly transmit power across the charging surface to a power receiving unit of a portable electronic device.

2. The wireless charger set forth in claim 1 wherein the hinge includes a u-shaped stem that extends through the aperture, the stem having a first end connected to a structure within the interior cavity of the base, a second end connected to the wireless charging assembly and a u-shaped portion between the first and second ends.

3. The wireless charger set forth in claim 2 wherein the stem includes a covered groove extending through the u-shaped portion, the groove including a groove opening at the second end.

4. The wireless charger set forth in claim 3 further comprising a wire that passes through the covered groove and electrically couples the power transmitting unit with circuitry within the base, and wherein the housing of the wireless charging assembly includes a housing opening aligned with the groove opening enabling the wire to pass directly from the stem into the housing.

5. The wireless charger set forth in claim 4 wherein the upper and lower shells are formed from a nonconductive material and the charger further comprises:
   a conductive shield disposed between the upper and lower shells;
   a connector having a connector opening at an exterior surface of the base to mate with a corresponding plug connector;
   a metal bracket having an opening aligned with the connector, wherein the metal bracket is electrically connected to the conductive shield.

6. The wireless charger set forth in claim 2 wherein:
   the hinge includes a pin block positioned within the interior cavity of the base, the pin block having a groove formed therein and a rotatable pin rotatably positioned within the groove; and
   the first end of the stem is attached to the rotatable pin enabling the wireless charging assembly to pivot around a longitudinal axis that bisects the center of the rotatable pin.

7. The wireless charger set forth in claim 1 wherein when the charging assembly is in the down position, the charging surface is parallel to the bottom surface of the base and when the charging assembly is in the up position, the charging surface is inclined with respect to the bottom surface.

8. The wireless charger set forth in claim 1 wherein the base has a circular shape and the base opening is a circular opening.

9. The wireless charger set forth in claim 1 wherein the base includes a top shell and a bottom shell connected together at a rim along an outer perimeter of the wireless charger, the top shell including an upper surface that has a continuous contour from of the opening to the rim.

10. A wireless charger for an electronic device, the wireless charger comprising:
   a donut-shaped base having an upper surface, a planar bottom surface and an inner sidewall extending between the upper surface and the bottom surface that defines a central base opening through the base, the base further including an interior cavity defined at least in part by the upper surface, the bottom surface and the inner sidewall positioned between the interior cavity and the base opening;
   an aperture formed through the inner sidewall between the interior cavity and the central base opening;
   a hinge having a rotational axis within the interior cavity and extending from the interior cavity through the aperture into the base opening;
   a wireless charging assembly pivotably attached to the base by the hinge and moveable between a down position in which the wireless charging assembly is disposed within the central base opening and an up position in which the wireless charging assembly is disposed outside the central base opening, the charging assembly having:
   a housing;
   a charging surface; and
   a power transmitting unit disposed within the housing and adjacent to the charging surface, the power transmitting unit configured to wirelessly transmit power across the charging surface to a power receiving unit of a portable electronic device.

11. The wireless charger set forth in claim 10 wherein the charging surface has a concave shape.

12. The wireless charger set forth in claim 10 wherein the wireless charging assembly includes at least one magnet to assist with alignment of the power transmitting unit to the power receiving unit of a portable electronic device.

13. The wireless charger set forth in claim 10 wherein the power transmitting unit is moveable within housing.

14. The wireless charger set forth in claim 10 wherein the when the wireless charging assembly is in the up position, the charging surface is angled between 80-89 degrees with respect to the bottom surface.

15. The wireless charger set forth in claim 10 wherein the hinge includes a u-shaped stem that extends through the aperture, the stem having a first end connected to a structure within the interior cavity of the base, a second end connected to the wireless charging assembly and a u-shaped portion between the first and second ends.

16. The wireless charger set forth in claim 10 wherein the hinge includes:
   a pin block positioned within the interior cavity of the base, the pin block having a groove formed therein and a rotatable pin rotatably positioned within the groove; and
   a stem that extends through the aperture, the stem having a first end connected to the rotatable pin within the interior cavity of the base and a second end connected to the wireless charging assembly enabling the wireless charging assembly to pivot around a longitudinal axis that bisects the center of the rotatable pin.

17. The wireless charger set forth in claim 10 further comprising a receptacle connector attached to the base and a wire that electrically couples one or more contacts in the receptacle connector to the power transmitting unit.

18. A wireless charger for an electronic device, the wireless charger comprising:
   a circular base having an interior cavity defined by an upper shell, a lower shell and a ring extending between the upper and lower shells to define a base opening through the circular base, wherein:
      the upper shell includes a first central circular opening, a first rim formed around a perimeter of the upper shell and a continuously curved surface extending from the first rim to the first central circular opening;
      the lower shell includes a second central circular opening, a second rim spaced adjacent to and attached to the first rim and formed around a perimeter of the lower shell, a substantially planar surface surrounding the second central circular opening and a curved surface extending between the substantially planer surface and the second rim; and
      the ring includes an interior sidewall surface positioned between the interior cavity and the base opening, and wherein the base opening is concentric with the first and second central circular openings and an upper annular surface adjacent to the upper shell;
   an aperture formed through the interior sidewall of the ring between the interior cavity and the opening through the base;
   a hinge having a rotational axis within the interior cavity and extending from the interior cavity through the aperture into the base opening;
   a wireless charging assembly pivotably attached to the base by the hinge and moveable between a down position in which the wireless charging assembly is disposed within the base opening parallel with the upper annular surface of the ring and an up position in which the wireless charging assembly is disposed outside the base opening, the charging assembly having:
      a housing;
      a concave charging surface; and
      a power transmitting unit disposed within the housing and adjacent to the concave charging surface, the power transmitting unit configured to wirelessly transmit power across the concave charging surface to a power receiving unit of a portable electronic device.

19. The wireless charger set forth in claim 18 wherein the wireless charging assembly includes a plurality of alignment features to facilitate proper alignment between the power transmitting unit of the wireless charger and the power receiving unit of a portable electronic device, the plurality of alignment features including a concave shaped charging surface and at least one alignment magnet positioned within the housing.

20. The wireless charger set forth in claim 19 wherein the power transmitting unit is moveable within housing.

* * * * *